US008400898B2

(12) United States Patent
Mikami et al.

(10) Patent No.: US 8,400,898 B2
(45) Date of Patent: Mar. 19, 2013

(54) OPTICAL RECORDING AND REPRODUCING APPARATUS

(75) Inventors: Hideharu Mikami, Kawasaki (JP);
Koichi Watanabe, Hachioji (JP);
Harukazu Miyamoto, Higashimurayama (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 228 days.

(21) Appl. No.: 12/893,069

(22) Filed: Sep. 29, 2010

(65) Prior Publication Data

US 2011/0080815 A1 Apr. 7, 2011

(30) Foreign Application Priority Data

Oct. 2, 2009 (JP) ................................. 2009-230160

(51) Int. Cl.
*G11B 7/00* (2006.01)
(52) U.S. Cl. ..................... 369/103; 369/47.19
(58) Field of Classification Search ............... 369/47.19, 369/94, 103
See application file for complete search history.

(56) References Cited

U.S. PATENT DOCUMENTS

| 4,711,815 | A | 12/1987 | Yoshiike et al. |
| 5,555,231 | A | 9/1996 | Yamamoto |
| 6,020,985 | A | 2/2000 | McLeod et al. |
| 2008/0067321 | A1 | 3/2008 | Miyamoto et al. |
| 2008/0068942 | A1* | 3/2008 | Saito et al. ................. 369/44.32 |
| 2008/0239924 | A1* | 10/2008 | Fujita et al. ................. 369/112.1 |
| 2008/0310281 | A1 | 12/2008 | Hara et al. |
| 2009/0175149 | A1* | 7/2009 | Bae et al. ...................... 369/103 |
| 2010/0046338 | A1* | 2/2010 | Saito et al. ................. 369/47.15 |
| 2010/0165825 | A1* | 7/2010 | Saito et al. .................... 369/121 |

FOREIGN PATENT DOCUMENTS

| EP | 1 235 210 A1 | 8/2002 |
| EP | 1 986 187 A1 | 10/2008 |
| GB | 2 122 408 A | 1/1984 |
| JP | 58-215735 | 12/1983 |
| JP | 61-211835 | 9/1986 |
| JP | 02-064932 | 3/1990 |
| JP | 3033864 | 2/2000 |

(Continued)

OTHER PUBLICATIONS

Robert R. McLeod et al.; Microholographic multilayer optical disk data storage, Applied Optics, Jun. 1, 2005, pp. 3197-3207, vol. 44, No. 16.

*Primary Examiner* — Wayne Young
*Assistant Examiner* — Brenda Bernardi
(74) *Attorney, Agent, or Firm* — Antonelli, Terry, Stout & Kraus, LLP.

(57) ABSTRACT

The present invention achieves an optical recording and reproducing apparatus focusing two opposed beams of light at a same place in an optical recording medium to record a standing wave generated by interference of the two beams of light. In the apparatus, phase information is recorded in the optical recording medium by a phase modulating means for modulating phase of one of the two beams of light. The reproduction reference light generated from a light source is allowed to interfere with reproduced light generated by projecting one of the two beams of light onto the optical recording medium to generate three or more beams of interfering light having different interference phases are simultaneously generated. The three or more beams of interfering light are then detected, and the phase modulated by the phase modulating means is demodulated from an output of the detector.

22 Claims, 21 Drawing Sheets

FOREIGN PATENT DOCUMENTS

| | | |
|---|---|---|
| JP | 2001-184649 | 7/2001 |
| JP | 3559590 | 5/2004 |
| JP | 2007-220206 | 8/2007 |
| JP | 2008-310924 | 12/2008 |

\* cited by examiner

Modulation: 0

Modulation: Δl

Δl/2

2001  2002  2003  2004

(a)          (b)

recording    regeneration 2-level　　　　　　　　　　　4-level

OPTICAL RECORDING AND REPRODUCING APPARATUS

CLAIM OF PRIORITY

The present application claims priority from Japanese patent application JP 2009-230160 filed on Oct. 2, 2009, the content of which is hereby incorporated by reference into this application.

BACKGROUND OF THE INVENTION

1. Field of the Invention

The present invention relates to an improvement in signal-to-noise ratio of regenerated signals in an optical disc apparatus.

2. Description of the Related Art

With regard to optical discs, the Blu-ray disc technology, which uses a blue semiconductor laser and a high NA objective lens, was commercialized, and optical systems have almost reached the limit of resolution of optical systems. An effective way of simultaneously implementing higher capacity and higher data transfer speed is multi-level recording. The techniques concerning the multi-level recording are described in Patent Documents 1 to 7 and the like.

Patent Documents 1 to 5 provide media in which the reflectivity of recording marks continuously changes with power of the recording light projected onto the recording media to implement recording at multiple levels. Patent Document 6 provides a method of modulating lengths and positions of recording marks in a predetermined cell to implement multi-level recording with patterns of the distribution of the amount of reflected light.

Patent Document 7 describes a technique to increase the recording capacity of a holographic memory for recording page data by recording the phase of information light at multiple levels. The outline of the technique will be described using FIG. 20. For recording data, first, a laser beam outputted from a light source 2001 is modulated by a spatial light modulator 2002 and then is made incident on a recording medium 2003 to record information. Herein, the spatial light modulator 2002 is composed of a number of pixels as shown in FIG. 21A. Light passing through central part of the spatial light modulator 2002 is subjected to phase modulation for each pixel to obtain information light (in the drawings, white part indicates a phase of 0, gray part performs phase modulation according to the color tone, and black part has a transmission of 0). Light passing through the periphery thereof is not modulated or is subjected to proper phase modulation to be reference light. An interference pattern of the information light and the reference light is recorded in the recording medium 2003. At the regeneration, at the spatial light modulator 2002, as shown in FIG. 21B, light passing through the central part of the spatial light modulator 2002 is not modulated and is DC light, and light passing through the periphery thereof is subjected to the same modulation as that for recording. The laser light having passed through the central part and the laser light having passed through the periphery are individually projected onto the recording medium. The projection of the reference light generates information light, and an image sensor 2004 detects light including the information light superimposed on the DC light. The detected light is interfering light of the information light and DC light. Each pixel of the information light is subjected to intensity modulation corresponding to the phase thereof for detection. Next, the phase of the DC light is equally changed by the spatial light modulator 2002, and similar measurement is carried out. The phase relationship between the information light and DC light at each pixel is then changed, and the image sensor 2004 therefore detects light having a different intensity pattern. The outputs of the image sensor 2004 are obtained in such a manner for four values of the phase of the DC light, 0, $\pi/2$, $\pi$, and $3\pi/2$, thus providing the phase value of each pixel of the information light. In Patent Document 7, intensity modulation is also performed together with the phase modulation to further increase the number of levels.

Another approach to increase the recording capacity is being studied (see Non-patent Document 1 and Patent Document 8, for example). In this approach, two beams of light traveling in opposite directions are focused on a same place of a recording medium nearly to the diffraction limit like ordinary optical discs such as CDs and DVDs. The interference pattern (standing wave) of the two beams of light around the light focusing point is recorded. This approach can provide a surface recording density as high as conventional optical discs while multiple recording layers can be implemented easily, multiple recording is possible, and capacity can be increased easily. Moreover, the approach is not required to have tight tolerance as that in the page data hologram and can be implemented comparatively easily although the approach is a method of recording interference.

Patent Document 1: JP 2001-184649 A (EP 1235210 A)
Patent Document 2: JP 58-215735 A (GB 2122408 A)
Patent Document 3: JP 02-064932 A
Patent Document 4: JP 3559590 B
Patent Document 5: JP 61-211835A (U.S. Pat. No. 4,711,815)
Patent Document 6: JP 3033864 B (U.S. Pat. No. 5,555,231)
Patent Document 7: JP 2008-310924 A (US 2008/0310281 A)
Patent Document 8: JP 2007-220206 A (EP 1986187 A)
Non-patent Document 1: R. R. Mcleod et al., "Microholographic multiplayer optical disc data storage," Appl, Opt., Vol. 44, 2005, pp. 3197

SUMMARY OF THE INVENTION

In Patent Documents 1 to 5, the multi-level data is judged depending on the magnitude of the amount of reflected light. However, as shown in FIG. 22, differences between the levels to be judged are smaller than the difference between the levels in recording and regeneration performed using two levels like ordinary optical discs, and thus is substantially equivalent to the situation where the signal level is reduced. In other words, there is a fundamental problem that the signal-to-noise ratio of signals decreases in proportion to the number of levels. Accordingly, it is virtually difficult to significantly increase the number of levels. In Patent Document 6, the signal light is detected using a number of detectors, and each detector receives a small amount of light. It is therefore difficult to increase the number of levels because of the low signal-to-noise ratio as described above. Furthermore, this approach requires a number of detectors and complicated signal processing for the outputs of the detectors, thus complicating the apparatus and increasing the cost.

In Patent Document 7, it is necessary to read four times for each recording place in order to read recorded phase information. Furthermore, it is necessary to change the phase of the DC light at each reading time. Changing the phase in such a manner takes time which is comparable to the response time of the phase modulator, thereby significantly reducing actual data reading speed (compared to the conventional case of intensity modulation). Furthermore, the power of the light source can fluctuate during the four reading times, and scattering light at the recording medium will accordingly fluctuate. The values read for four times to estimate the phase value can therefore include random errors, thus causing fluctuations in estimated phase values. Similarly, noise from the detectors can also cause fluctuations in the phase values. The phase fluctuations due to the detectors will not matter if the light intensity to be detected is high enough. The light intensity high enough could be obtained if the DC light has enough intensity. However, since the amount of light that each detector can accept is actually limited because of saturation of the detector, high enough light intensity may not be obtained. For the above reasons, the method of Patent Document 7 can cause fluctuations in phase values, and it is virtually difficult to significantly increase the number of levels of the phase.

With the methods of Patent Document 8 and Non-patent Document 1, the capacity can be easily increased, but it is difficult to increase the data transfer speed because the surface recording density cannot be increased to more than that of the conventional arts. Moreover, the intensity of signal light in these methods is generally faint. Similarly to Patent Document 1, the signal levels are therefore substantially reduced when the recording and regeneration are performed at multiple levels, and the signal-to-noise ratio is significantly insufficient. Accordingly, it is virtually difficult to perform recording and regeneration at multiple levels.

In the light of the aforementioned problems, an object of the present invention is to provide an optical recording and regenerating or reproducing apparatus capable of providing high recording density and high speed reading with the number of levels easily increased.

To achieve the object of the present invention, the following aspect is employed.

(1) In an optical recording and regenerating or reproducing apparatus focusing two opposed beams of light at a same place in an optical recording medium to record a standing wave generated by interference of the two beams of light, phase information is recorded in the optical recording medium by a phase modulating means modulating phase of one of the two beams of light, regeneration or reproduction reference light interferes with regenerated or reproduced light to simultaneously generate three or more beams of interfering light with different interference phases, the regeneration or reproduction reference light being generated by a light source, the regenerated or reproduced light generated by projecting one of the two beams of light onto the optical recording medium on which the information is recorded, the three or more beams of interfering light are detected, and the phase modulated by the phase modulating means is demodulated from an output of a detector.

It is therefore possible to perform accurate recording and regeneration of multi-level signals with no influence from various noises and moreover increase both the recording density and data transfer speed.

The two beams of light traveling in opposite directions are focused to a same place of the medium. However, it is unnecessary to completely align the peaks of the Gaussian distributions of the two beams of light. The beams of light only need to be aligned so as to generate interference thereof.

(2) In another aspect, the phase to be modulated by the phase modulating means is differentially coded. This can eliminate errors of the detected phase due to disc surface fluctuation of the optical recording medium at recording or regeneration and other causes and allows the number of levels to be easily increased.

(3) In another aspect, interference phases of the four beams of interfering light differ from one another by substantially 90 degrees, and each pair of the beams of interfering light having a difference in interference phase of substantially 180 degrees is detected by a differential detector of current differential detection type This can prevent saturation of the detector due to the intensity of the regeneration reference light at regeneration and can provide a sufficient amplification effect. The optical recording and regenerating apparatus can ensure a sufficient signal-to-noise ratio.

(4) In another aspect, the light source emits pulses of light, and the phase modulating means drives a certain driving phase while the light source is emitting light and the phase modulating means changes the driving phase while the light source is not emitting light.

This can maintain highly accurate phase recording and allows the number of levels to be easily increased.

(5) In another aspect, path length adjustment is performed on both or any one of the two beams of light and path length adjustment is performed on both or any of the beams regenerated light and the regeneration reference light. This can minimize phase errors occurring at recording and regeneration even if the disc surface fluctuation of the recording medium is very large, and allows the number of levels to be easily increased.

(6) In another aspect, the path length adjustments are performed by the same mechanism. This can miniaturize the apparatus and reduce the cost.

(7) In another aspect, one of the two beams of light which is not used in generation of the regenerated light is used as the regeneration reference light. This allows the optical axes of the regenerated light and the regeneration reference light at regeneration to be aligned, thus providing stable signal outputs.

(8) In another aspect, one of the two beams of light which is used in generation of the regenerated light is used as the regeneration reference light. This allows the optical axes of the regenerated light and the regeneration reference light at regeneration to be aligned, thereby providing stable signal outputs. Moreover, the light use efficiency can be increased.

(9) In another aspect, in an optical recording and regenerating apparatus focusing two opposed beams of light at a same place in an optical recording medium to record a standing wave generated by interference of the two beams of light, complex amplitude information is recorded in the optical recording medium by a complex amplitude modulating means modulating complex amplitude of optical electric field of one of the two beams of light, regeneration reference light interferes with regenerated light to simultaneously generate three or more beams of interfering light with different interference phases, the regeneration reference light being generated by a light source, the regenerated light generated by projecting one of the two beams of light onto the optical recording medium on which the information is recorded, the three or more beams of interfering light are detected, and the complex amplitude modulated by the complex amplitude modulating means is demodulated from an output of a detector. This can increase the number of levels compared to the case of performing only phase modulation, thus implementing an increase in capacity and transfer speed.

(10) In another aspect, the complex amplitude modulating means includes an intensity modulating means and a phase modulating means and the intensity modulating means modulates light emission intensity of the light source. This can reduce the number of parts, thus reducing the size and cost.

(11) In another aspect, the complex amplitude modulating means is composed of a single phase modulating means which changes the phase at recording the interference pattern to modulate the intensity of the regenerated light and changes the central value of the modulation phase for phase modulation. This can reduce the number of parts, thus resulting in reduction in size and cost.

Consequently, it is possible to provide an optical recording and regenerating apparatus providing high recording density and high data transfer speed with the number of recording levels easily increased.

DESCRIPTION OF THE PREFERRED EMBODIMENTS

Embodiment 1

Description will be given of an embodiment of the present invention using FIG. 1.

Figure 1:
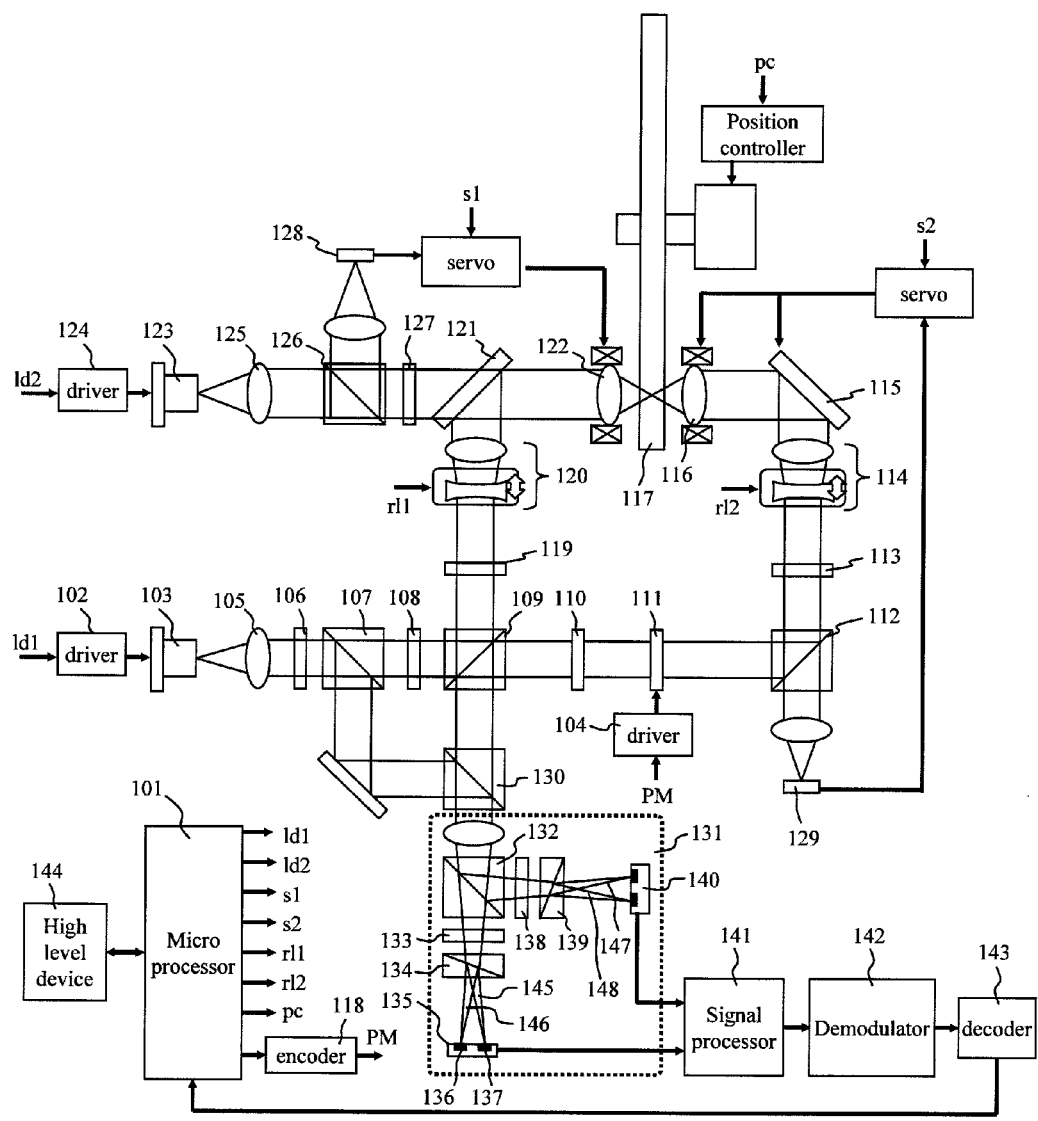
FIG. 1 shows a basic embodiment of the present invention.

FIG. 1 shows a basic embodiment of the present invention. First, the description will be given of a recording operation. Upon an instruction from a microprocessor 101, a driver 102 drives a semiconductor laser 103 so as to pulse in synchronization with signal modulation by a driver 104 later described, thereby allowing the semiconductor laser 103 to emit pulsing beams of light. Each beam of light is converted to parallel light by a collimation lens 105 and is then transmitted through a half-wave plate 106 into a polarizing beam splitter 107. The polarizing beam splitter 107 has a function of transmitting substantially 100% of p-polarized light and reflecting substantially 100% of s-polarized light both of which are incident on a splitting surface. Beams of light from the semiconductor laser are p-polarized and the direction of the optical axis of the half-wave plate 106 is set to 0 degree with respect to the horizontal plane at recording, so that all the beams of light are transmitted through the polarizing beam splitter 107. Next, after passing through a half-wave plate 108, the beam of light is incident on a polarizing beam splitter 109. At recording, the direction of the optical axis of the half-wave plate 108 is set to 22.5 degrees with respect to the horizontal plane. The beam of light is therefore converted into 45-degrees polarized light and is incident on the polarizing beam splitter 109, where the p-polarized component of the beam of light is transmitted therethrough while the s-polarized component is reflected thereon. The transmitted light (hereinafter, referred to as signal light) and reflected light (hereinafter, referred to as reference light) are used for recording.

The signal light is converted to s-polarized light by a half-wave plate 110 and is then passed through a phase modulator 111 to be phase-modulated in synchronization with the pulsing beams of light emitted from the semiconductor laser 103. Next, the signal light is reflected on the polarizing beam splitter 112 and is converted to have right circular polarization by a quarter-wave plate 113. The signal light then passes through a relay lens 114 and is reflected on a galvano-mirror 115 to be focused within a recording medium 117 by an objective lens 116.

User data sent from the microprocessor 101 is encoded by an encoder 118 as multi-valued data and is then sent to the driver 104 as modulation signal used at the phase modulator 111. In this embodiment, the phase modulator 111 performs eight-level modulation and adds to signals eight phases of 0, $\pi/4$, $\pi/2$, $3\pi/4$, $\pi$, $5\pi/4$, $3\pi/2$, and $7\pi/4$. In order to acquire later-described stable regenerated signals, differential coding is performed. Specifically, the difference between a value for a certain modulation phase and a value for a previous modulation phase is calculated as the recording signal.

The reference light passes through a quarter-wave plate 119 to be converted into left circular polarized light and then passes through a relay lens 120. The reference light is then reflected on a dichroic mirror 121 and is focused within the recording medium 117 by an objective lens 122.

Figure 2:
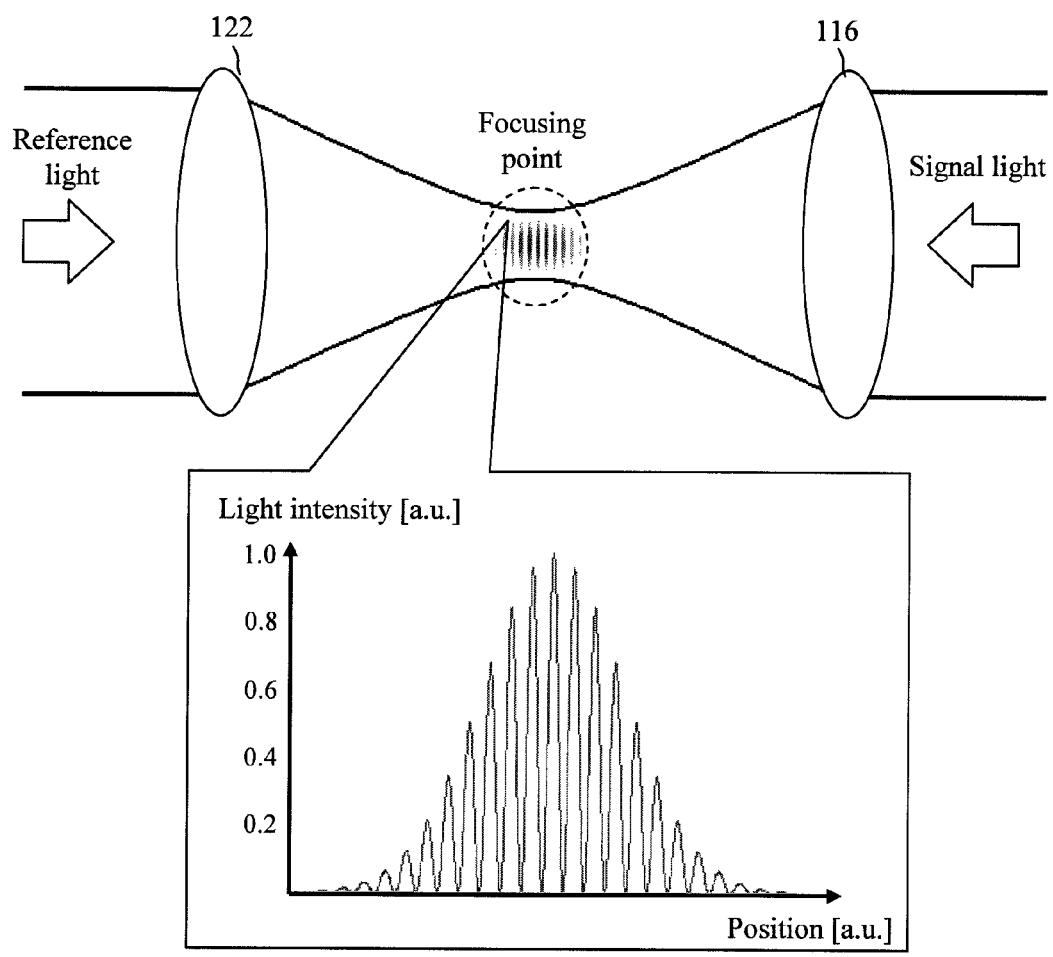
FIG. 2 is an explanatory view of generation of standing waves from two beams of light traveling in opposite directions.

The signal light and reference light are focused onto a same place in the recording medium 117. The signal light and reference light, which travel in opposite directions, interfere with each other to generate a standing wave (interference pattern) in a light intensity distribution as shown in FIG. 2. The signal light and reference light have power densities extremely high in the vicinity of the focusing point. Accordingly, the standing wave substantially localize in the vicinity of the focusing point as shown in FIG. 2. The recording medium 117 changes in reflectivity according to the magnitude of the intensity of the standing wave at each position, and the pattern of interference fringes is recorded as the change in reflectivity of the medium.

Figure 3:
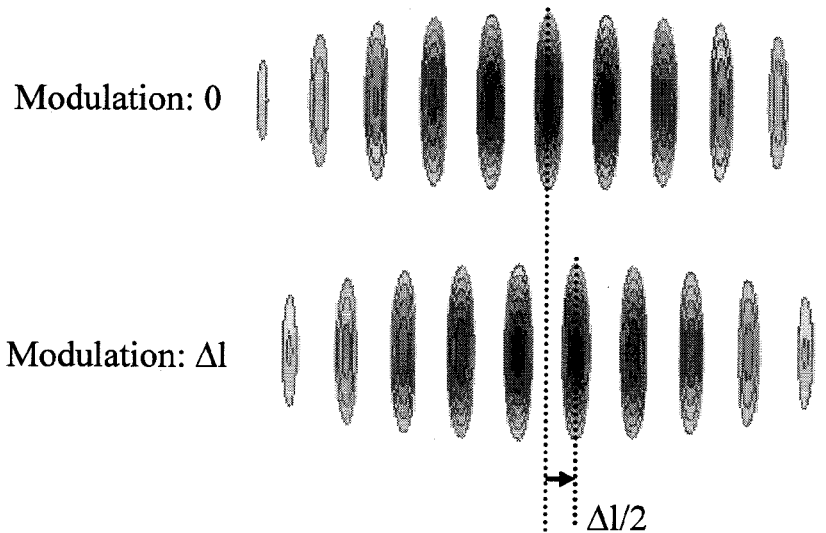
FIG. 3 is a view explaining the principle of phase recording using the standing waves.

The principle of the phase recording in the present invention will be described. As for the aforementioned interference pattern, the positions with an intensity of 0 (the positions of nodes of the standing wave), for example, are determined depending on the path length difference (phase difference) between the signal light and reference light. Accordingly, if the phase (path length) of the signal light is changed by the phase modulator 111, the distribution of interference fringes is shifted in the direction of light travel as shown in FIG. 3. To be precise, the envelope due to the power densities of the signal light and reference light does not change, and only the phase of the interference pattern is shifted. In other words, the amount of phase shift given to the signal light is recorded as a position of the reflectivity distribution in the direction of light travel in the recording medium.

The above principle will be described using equations for better understanding. The signal light and reference light are considered as substantially plane waves near the focusing point, and the electric fields thereof are expressed as:

$$E_s = \sqrt{I_s} \exp\left[\frac{2\pi}{\lambda}i(x-ct)\right] \quad (1)$$

$$E_r = \sqrt{I_r} \exp\left[\frac{2\pi}{\lambda}i(-x-ct)\right] \quad (2)$$

Herein, I is the intensity of the signal light and reference light (assuming that the signal light and reference light have the same intensity); λ, light wavelength; n, reflectivity of the recording medium; x, the coordinate in the direction of light travel; c, speed of light; and t, time.

The intensity of interfering light generated by superposition of the signal light and reference light is expressed as:

$$|E_s + E_r|^2 = \left|\sqrt{I}\exp\left[\frac{2\pi}{\lambda}i(x-ct)\right] + \sqrt{I}\exp\left[\frac{2\pi}{\lambda}i(-x-ct)\right]\right|^2 \quad (3)$$

$$= 2\left[I + I\cos\left[4\pi\frac{x}{\lambda}\right]\right]$$

$$= 4I\cos^2\left[\pi\frac{x}{\lambda}\right].$$

Equation (3) does not include the time t. Accordingly, the intensity distribution of the interfering light represents a standing wave not depending on time. The period thereof is a half wavelength λ/2. Herein, if the path length of the signal light is modulated by Δl, the intensity distribution of the interfering light is expressed as:

$$|E_s + E_r|^2 = \left|\sqrt{I}\exp\left[\frac{2\pi}{\lambda}i(x+\Delta l-ct)\right] + \sqrt{I}\exp\left[\frac{2\pi}{\lambda}i(-x-ct)\right]\right|^2 \quad (4)$$

$$= 4I\cos^2\left[\pi\frac{x+\Delta l/2}{\lambda}\right]$$

The intensity distribution of the interference pattern is shifted by Δl/2. Accordingly, the modulation of the path length (phase) of the signal light appears in the form of the shift of the intensity distribution of the interference pattern and is recorded as the medium reflectivity distribution. The important thing herein is that the light path (phase) to be modulated and the shift amount of the interference pattern to be recorded have a perfect linear relationship and the proportionality factor thereof does not depend on the recording medium and the optical system. In the conventional multi-level recording schemes of Patent Document 1 and the like, it is difficult to accurately record the multiple levels because the recording medium does not linearly respond to the modulation level of the intensity or the like or the proportionality factor depends on the medium or optical systems. With the method of the present invention, the amount of modulation is very precisely reflected on the recording state as described above, thus providing easy and highly accurate recording. It is therefore possible to easily increase the number of levels.

Figure 4:
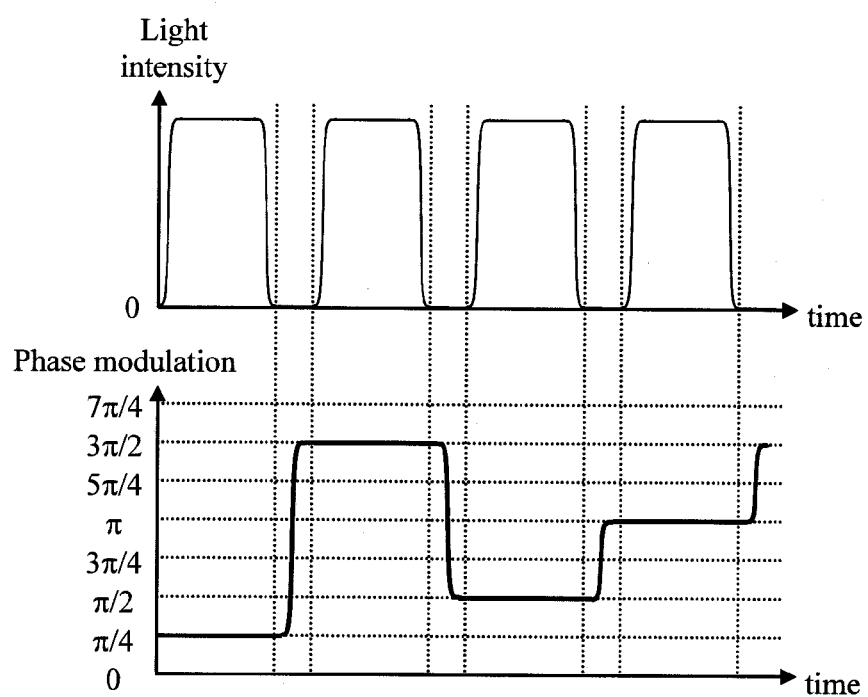
FIG. 4 is a view showing a relationship between a light emission pattern of a light source and phase modulation.

Next, the pulses of emitted light and the modulation by the phase modulator 111 will be described in detail. It is desirable that the modulation phase be constant while one phase-modulated signal is being recorded on the recording medium. If not, a plurality of interference patterns having different phases would be recorded at a same place, thereby reducing the level of the regenerated signal or causing an error in the regenerated signal. Accordingly, as shown in FIG. 4, the modulation phase of the phase modulator should be fixed while the light source is emitting light and be changed to the next modulation phase while the light source is not emitting light.

Figure 5:
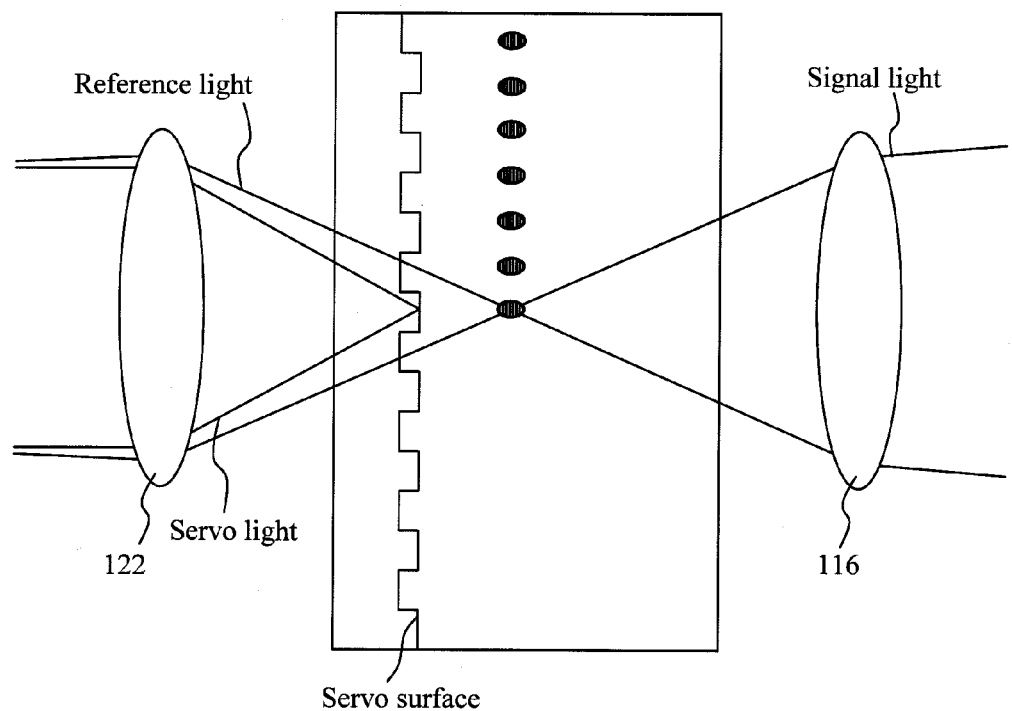
FIG. 5 is a view showing signal light, reference light, and servo light in a recording medium.
Figure 6:
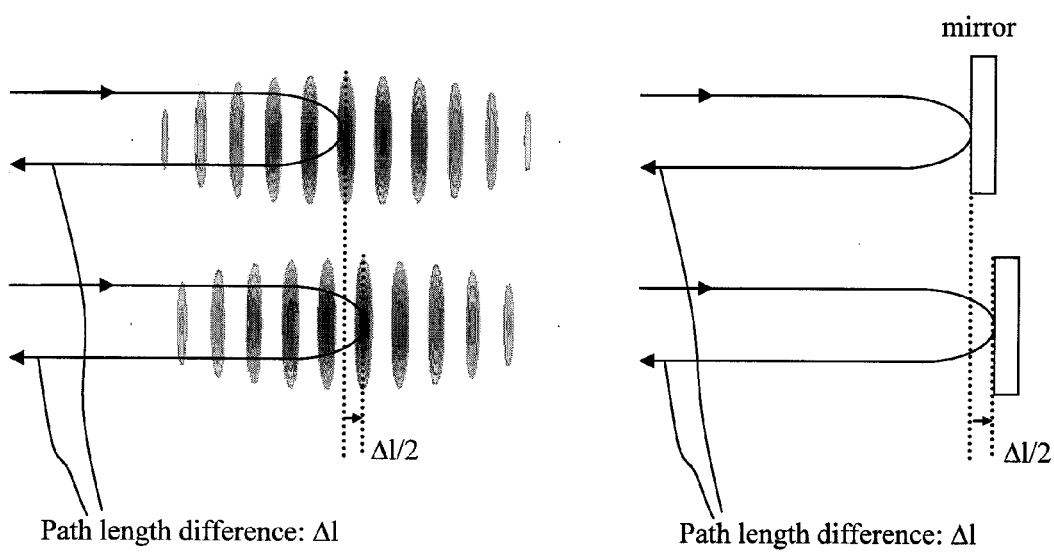
FIG. 6 is a view explaining that the phase of regenerated light is modulated according to the positions of the recorded standing waves.

Back to FIG. 1, the description will be given of a servo mechanism for stable recording. The semiconductor laser 123 is a semiconductor laser oscillating with a wavelength different from that of the semiconductor laser 103. The semiconductor laser 123 is driven by a driver 124 based on an instruction from the microprocessor 101 to emit a beam of p-polarized light (hereinafter, such a beam is referred to as servo light). In this embodiment, the light source 103 has a wavelength of 405 nm, and the light source 123 has a wavelength of 650 nm. The beam of p-polarized light passes through a collimator 125 into parallel light and then passes through a polarizing beam splitter 126 and a quarter-wave plate 127 to have right circular polarization. The beam of light is then incident on a dichroic mirror 121. The dichroic mirror 121 has a property of reflecting 405 nm light and transmitting 650 nm light. This allows the servo light to be coaxial with the reference light. The servo light is focused by an objective lens 122 on a servo surface formed within the recording medium 117 (see FIG. 5). The servo surface includes grooves like recording-type CDs, DVDs, and the like. Light reflected on the servo surface is detected by a quadrant detector, and a servo signal is fed back to an objective lens actuator, for focusing servo and tracking servo. In this embodiment, the astigmatic method is employed for focusing servo, and a push-pull method is employed for tracking servo. Since the reference light is coaxial with the servo light, the relative position of the focusing point on the recording medium is maintained. Accordingly, relay lenses 114 and 120 are properly set to record an interference pattern in a plane at a certain distance from the servo surface. Moreover, one of the lenses constituting each relay lens is moved in the optical axis direction to change the position of the focusing point of the reference light. This allows multilayer recording in a uniform recording medium. The relay lenses 114 and 120 are designed to cancel the spherical aberration caused in the recording medium for each setting so that light can be focused to the diffraction limit.

In this embodiment, the semiconductor laser 123 is used as the light source for generating the servo light separately from the semiconductor laser 103 for generating the signal light and reference light. However, such a configuration is not essential in the present invention. The signal light, reference light, and servo light may be generated from the same light source.

On the other hand, the signal light needs to be focused to the same focusing point in the recording medium 117 as that of the reference light. Accordingly, the servo drive is performed using the reference light transmitted through the recording medium 117. To be specific, the reference light having passed through the recording medium 117 is detected by the quadrant detector 129. The position of the objective lens 116 in the optical axis direction is then controlled by the astigmatic method, and the position of the objective lens 116 in the radial direction is controlled by a radial push-pull method. Moreover, the angle of the galvano-mirror 115 in the tangential direction is controlled by a tangential push-pull method. The beams of the reference light and signal light are completely coincident with each other (the travel direction is opposite from each other), and the focusing points of the signal light and reference light are therefore coincident, thereby effectively generating the standing wave.

Next, the regeneration operation will be described. The semiconductor laser 103 emits DC light, and the emitted light passes through the half-wave plate 106 to be incident on the polarizing beam splitter 107. At regeneration, the direction of the optical axis of the half-wave plate 106 is set at 22.5 degrees with respect to the horizontal direction. The s component of the beam of 45-degrees polarized light is reflected on the polarizing beam splitter 107 while the p component is transmitted therethrough. The transmitted light passes through the half-wave plate 108 and is incident on the polarizing beam splitter 109. The direction of the optical axis of the half-wave plate 108 is set at 45 degrees with respect to the horizontal direction during regeneration. The beam of light obtains s polarization at the half-wave plate 108 and is then fully reflected on the polarizing beam splitter 109. In other words, the beam of light called the signal light at recording is not generated, and only the reference light is generated. The reference light travels the same path as that at recording and is then focused within the recording medium 117 by the objective lens 122 servo-controlled by the beam of light from the semiconductor laser 123 in a similar way to recording. Herein also, the reference light is focused on a predetermined recording layer by properly setting the relay lens 120.

When the reference light is projected at places where the standing wave is recorded as the change in reflectivity of the recording medium 117 at recording, the reflected light is generated by the periodical change in reflectivity. The phase of the reflected light varies depending on the position of the recorded interference pattern in the optical axis direction. This is understood as follows. For example, if the distribution of change in reflectivity as a reflector is shifted away, twice the distance that the distribution is shifted is added to the path length in the same way as reflection on a general mirror. As described above, a half of the path length which is added to the signal light by the phase modulator at recording is the shift amount of the standing wave distribution. Accordingly, at regeneration, the reflected light is given twice the shift amount, or the phase amount equal to that added to the signal light by the phase modulator 111. The reflected light is therefore emitted with a same phase as that of the signal light of recording. Hereinafter, the reflected light is referred to as regenerated light.

The regenerated light travels the optical path of the reference light in the reverse direction. The regenerated light is converted to p-polarized light by the quarter-wave plate 119 to be transmitted through the polarizing beam splitter 109 and a polarizing beam splitter 130. On the other hand, the beam of s-polarized light reflected on the polarizing beam splitter 107 is reflected on the polarizing beam splitter 130 to be coaxial with the regenerated light. This beam of s-polarized light is referred to as regeneration reference light.

The regenerated light and regeneration reference light which are polarized perpendicularly to each other are incident on a detection optical system 131. The incident beam of light is split into transmission light and reflected light by a non-polarizing half beam splitter 132. The transmission light passes through a half-wave plate 133, which has an optical axis set at 22.5 degrees with respect to the horizontal direction, so that the polarization thereof is rotated by 45 degrees. The transmission light is then separated into p-polarized and s-polarized components by a Wollaston prism 134. The separated beams of light are individually incident on two photodiodes 136 and 137 of a differential detector 135, and the differential detector 135 outputs an electric signal proportional to the difference in intensity therebetween. In a similar way, the beam of light reflected on the non-polarizing half beam splitter 132 passes through a quarter-wave plate 138, which has an optical axis set at 45 degrees with respect to the horizontal plane, and is then separated by a Wollaston prism 139 to be detected by a differential detector 140. As described later, each of the beams of light separated by the Wollaston prism 139 is light resulting from interference of the regenerated light and regeneration reference light, and the differential detectors 135 and 140 extract and output the interference components.

The outputs of the differential detectors 135 and 140 are sent to a digital signal processing circuit 141, where the recorded phase value is obtained as the regenerated signal. The obtained phase value is demodulated by a demodulator 142 and is sent to a decoding circuit 143 to be converted to the user data, which is then sent to a higher-level apparatus 144 through the microprocessor 101.

The description will be given of the principle of generating the interfering light at the detection optical system 131 and regenerating the phase value. The beam of light incident on the detection optical system 131 includes the regenerated light as the p-polarized component and the regeneration reference light as the s-polarized component. The polarization is therefore expressed by a Jones vector:

$$\begin{pmatrix} E_r \\ E_s \end{pmatrix} \tag{5}$$

Herein, Es indicates an electrical field of the regenerated light, and Er indicates an electrical field of the regeneration reference light. The first component indicates the p-polarized component, and the second component indicates the s-polarized component. The Jones vector of the beam of light after the beam of light is passed through the non-polarizing beam splitter 132 and half-wave plate 133 is expressed as:

$$\begin{pmatrix} \cos 45° & -\sin 45° \\ \sin 45° & \cos 45° \end{pmatrix} \begin{pmatrix} E_r/\sqrt{2} \\ E_s/\sqrt{2} \end{pmatrix} = \begin{pmatrix} (E_r - E_s)/2 \\ (E_r + E_s)/2 \end{pmatrix} \quad (6)$$

Next, the beam of light is separated by the Wollaston prism 134 into the p-polarized and s-polarized components, and the electrical fields of the separated beams of light are:

$$\frac{1}{2}(Er - Es) \quad (7)$$

$$\frac{1}{2}(Er + Es) \quad (8)$$

The above equations express superposition of the regenerated light and regeneration reference light, that is, interfering light. On the other hand, after the beam of light is reflected on the non-polarizing beam splitter 132 and passes through the quarter-wave plate 138, the Jones vector thereof is:

$$\frac{1}{\sqrt{2}} \begin{pmatrix} i - \cos 90° & \sin 90° \\ \sin 90° & i + \cos 90° \end{pmatrix} \begin{pmatrix} E_r/\sqrt{2} \\ -E_s/\sqrt{2} \end{pmatrix} = \begin{pmatrix} i(E_r + iE_s)/2 \\ (E_r - iE_s)/2 \end{pmatrix} \quad (9)$$

Next, the beam of light is separated by the Wollaston prism 139 into the p- and s-polarized components, and the electrical fields of the separated beams of light are expressed as:

$$\frac{i}{2}(E_r + iE_s) \quad (10)$$

$$\frac{1}{2}(E_r - iE_s) \quad (11)$$

The separated beams of light are also superposition of the regenerated light and regeneration reference light, that is, interfering light. Accordingly, intensities of four separated beams of light 145 to 148 are expressed by Equations (12) to (15), respectively:

$$\left|\frac{1}{2}(E_r - E_s)\right|^2 = \frac{1}{4}|E_r|^2 + \frac{1}{4}|E_s|^2 - \frac{1}{2}|E_r E_s|\cos\Delta\phi \quad (12)$$

$$\left|\frac{1}{2}(E_r + E_s)\right|^2 = \frac{1}{4}|E_r|^2 + \frac{1}{4}|E_s|^2 + \frac{1}{2}|E_r E_s|\cos\Delta\phi \quad (13)$$

$$\left|\frac{i}{2}(E_r + iE_s)\right|^2 = \frac{1}{4}|E_r|^2 + \frac{1}{4}|E_s|^2 + \frac{1}{2}|E_r E_s|\sin\Delta\phi \quad (14)$$

$$\left|\frac{i}{2}(E_r - iE_s)\right|^2 = \frac{1}{4}|E_r|^2 + \frac{1}{4}|E_s|^2 - \frac{1}{2}|E_r E_s|\sin\Delta\phi \quad (15)$$

The first and second terms of each equation express the intensity components of the regenerated light and the regeneration reference light, respectively, and the third term expresses interference of the regenerated light and the regeneration reference light. $\Delta\phi$ is the phase of the regenerated light with respect to the phase of the regeneration reference light and is the modulation signal to be reproduced. The output of the differential detector 135 is proportional to the difference between the intensities of the separated beams 145 and 146, and the differential detector 140 is proportional to the difference between the intensities of the separated beams 147 and 148. The outputs thereof are expressed by Equations (16) and (17).

$$D_1 = \eta |E_r E_s|\cos\Delta\phi \quad (16)$$

$$D_2 = \eta |E_r E_s|\sin\Delta\phi \quad (17)$$

The outputs are proportional to the terms expressing the interference. $\eta$ indicates the conversion efficiency of the detectors.

The outputs of the differential detectors 135 and 140 are first subjected to A/D conversion and inputted into a calculation circuit in the digital signal processing circuit 141, which then outputs the following calculation results.

$$\Delta\phi = \begin{cases} \arctan\dfrac{D_2}{D_1} & (D_1 \geq 0) \\ \pi + \arctan\dfrac{D_2}{D_1} & (D_1 < 0) \end{cases} \quad (18)$$

In such a manner, the phase value of the regenerated light can be obtained by generating the interfering light of the regenerated light and the regeneration reference light and detecting the interfering light in the detection optical system 131.

Figure 24:
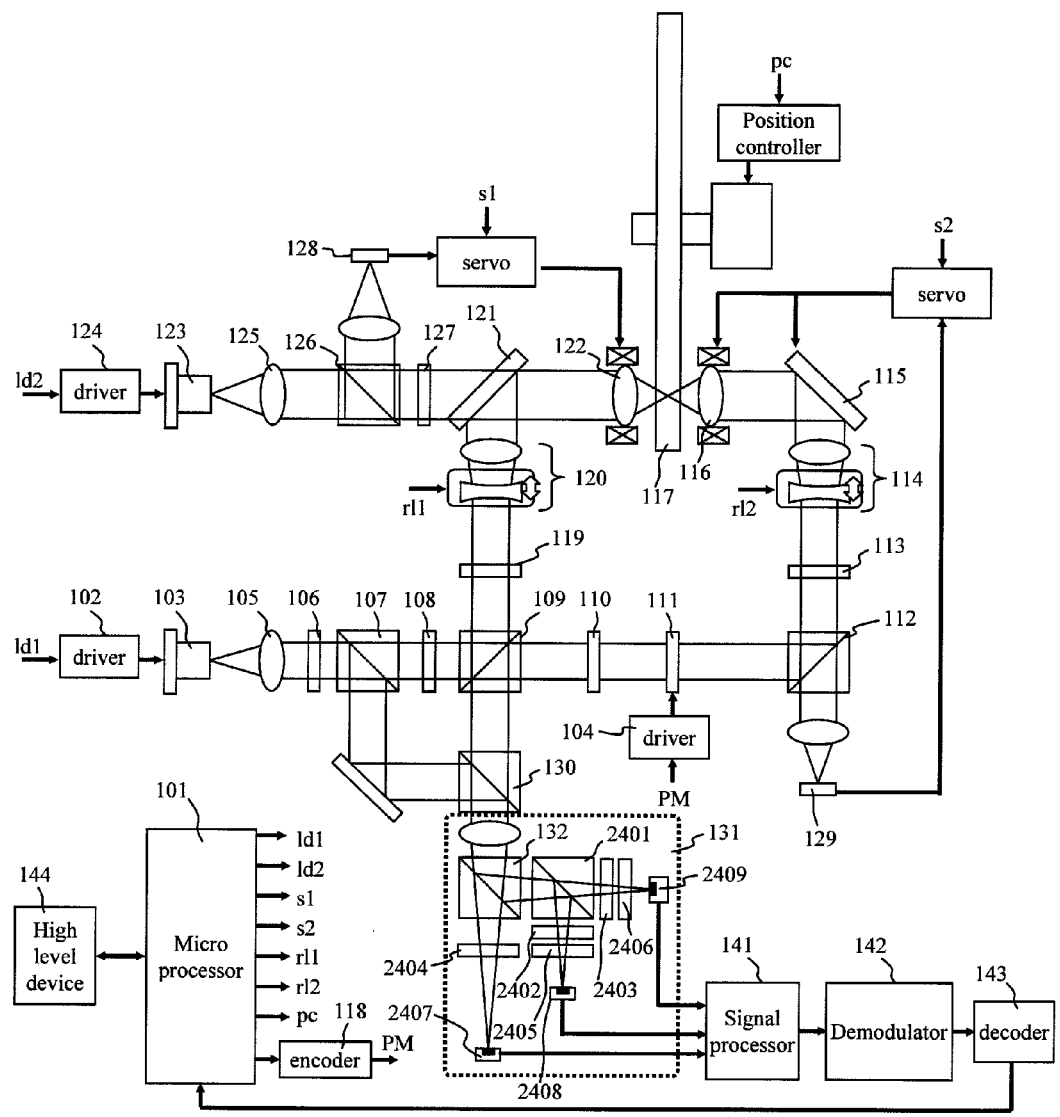
FIG. 24 is a configuration view of an information recording and regenerating apparatus in which beams of light having three different phases is detected by a detection optical system.

The phase value is estimated from the intensities of the four beams of interfering light in this embodiment. Herein, the parameters determining the intensity of interference light are these three: 1) signal light intensity; 2) reference light intensity; and 3) the phase difference between the signal light and the reference light. Accordingly, the phase value can be estimated in principle by detecting the intensities of three beams of interfering light with different phases (in addition, the intensity of the signal light can be estimated). For example, as shown in FIG. 24, in the detection optical system 131, the beam of incident light is split into three beams by the non-polarizing beam splitter 132 and a non-polarizing beam splitter 2401. One of the split beams of light is passed through a phase plate 2402, which generates a phase difference of 120 degrees between the s- and p-polarized components, and another one thereof is passed through a phase plate 2403, which generates a phase difference of 240 degrees between the s- and p-polarized components. The three beams of light are transmitted through polarizers 2404 to 2406, which transmit only 45-degrees polarized light, and are detected by detectors 2407 to 2409. The outputs of the detectors are expressed as follows:

$$I_1 = \left|\frac{1}{\sqrt{3}} E_s + \frac{1}{\sqrt{3}} E_r\right|^2 \quad (19)$$

$$= \frac{1}{3}|E_s|^2 + \frac{1}{3}|E_r|^2 + \frac{2}{3}|E_s||E_r|\cos\Delta\phi$$

$$I_2 = \left|\frac{1}{\sqrt{3}} E_s + \frac{1}{\sqrt{3}} e^{\frac{\pi}{3}i} E_r\right|^2 \quad (20)$$

$$= \frac{1}{3}|E_s|^2 + \frac{1}{3}|E_r|^2 + \frac{2}{3}|E_s||E_r|\cos\left(\Delta\phi - \frac{\pi}{3}\right)$$

-continued $$I_3 = \left|\frac{1}{\sqrt{3}}E_s + \frac{1}{\sqrt{3}}e^{\frac{2\pi}{3}i}E_r\right|^2 \quad (21)$$

$$= \frac{1}{3}|E_s|^2 + \frac{1}{3}|E_r|^2 + \frac{2}{3}|E_s||E_r|\cos\left(\Delta\phi - \frac{2\pi}{3}\right)$$

Herein, the conversion efficiency of the detectors is omitted. From the obtained outputs, the phase value can be estimated by the following calculation.

$$\Delta\phi = \frac{\sqrt{3}(I_2 - I_3)}{2I_1 - I_2 - I_3} \quad (22)$$

The intensity can be estimated by the following calculation.

$$|E_s||E_r| = \sqrt{\left(I_{PD1} - \frac{I_{PD2} + I_{PD3}}{2}\right)^2 + 3\left(\frac{I_{PD2} - I_{PD3}}{2}\right)^2} \quad (23)$$

The above description is about the example for detecting the intensities of the three beams of interfering light with different phases. It is also possible to detect the intensities of three or more beams of interfering light with different phases, such as four or five beams of interfering light, by adjusting the phases and polarization.

Figure 7:
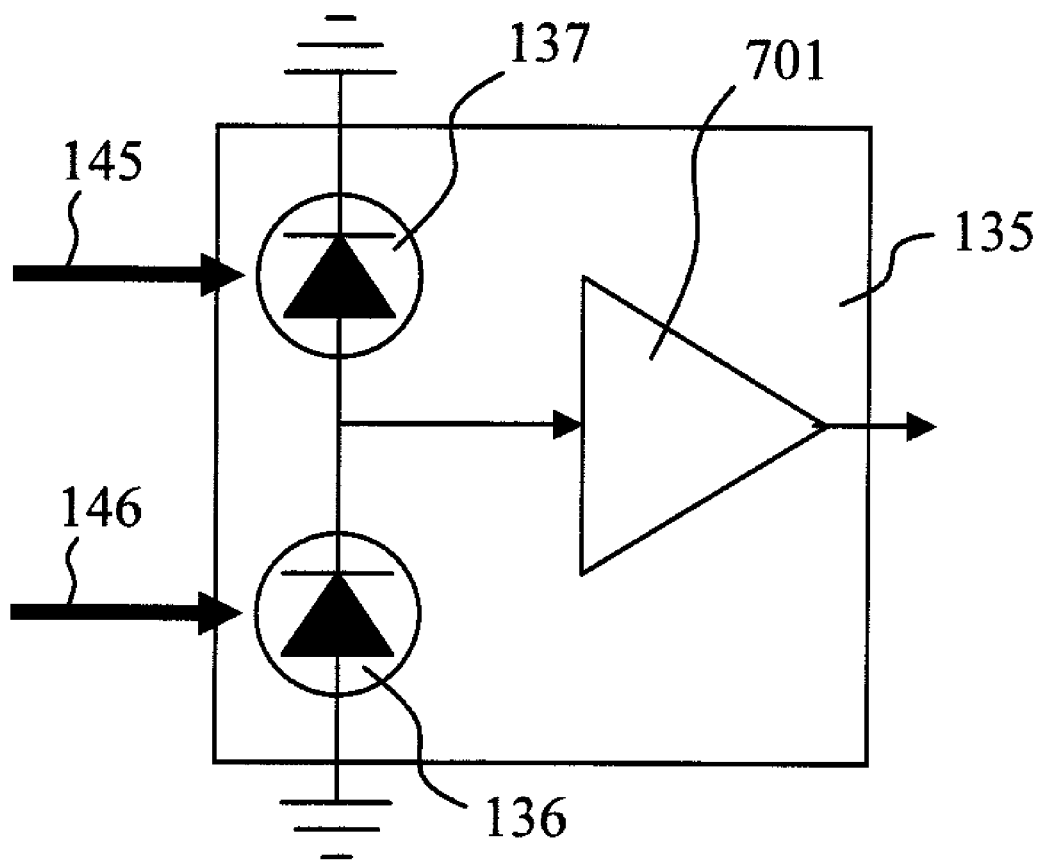
FIG. 7 is a diagram showing a configuration of a current differential detector.

The description will be given that the phase detection method of the present invention can provide a signal-to-noise ratio higher than the conventional one. In a general optical regenerating apparatus, major noises included in regenerated signals are classified into laser noise, disc noise, detector noise, and shot noise (hologram memories for page data further have a problem of noise due to scattering light). In most of the conventional arts, such as that in Patent Document 1 and commercially-available optical discs including CDs and DVDs, a change in intensity of light reflected on the recording medium is read as a signal at regeneration. Accordingly, laser noise, which is fluctuation in light emission intensity of the light source, is added to the regenerated signal as noise and reduces the signal-to-noise ratio. As already described in Patent Document 7, laser noise can cause error in the phase value when the phase value is obtained from the four outputs. On the other hand, in the present invention, the outputs are obtained independently of the intensity of the light source as shown in Equation (18) and are not affected by laser noise. The important thing is that four separated beams of light are obtained simultaneously and the outputs of the differential detectors are obtained simultaneously. Accordingly, the separated beams of light equally vary even if the intensity of the regenerated light or the regeneration reference light fluctuates. As shown in Equation (18), the calculation includes the ratio of the outputs $D_1$ and $D_2$ of the differential detectors, and the fluctuations in intensities are always canceled with each other. Accordingly, the output is not affected by laser noise. Next, disc noise is fluctuation in reflectivity of the recording medium and acts as a fluctuation component of the output like laser noise in methods of reading the change in intensity of light reflected on the recording medium as a signal. In the present invention, however, the changes in intensity of the reflected light are canceled in a similar way to laser noise, and disc noise has therefore less influence on the output. Detector noise is noise due to the detectors independent of the detected light. Detector noise rises as a problem when the amount of detected light is small because of a small reflectivity of the recording medium or the like. In the present invention, the influence of detector noise can be reduced with sufficiently large amount of the regeneration reference light. This can be easily understood based on Equations (16) and (17). The detector noise is included in the outputs of the differential detectors expressed by Equations (16) and (17). However, large intensity of the regeneration reference light can increase the values of Equations (16) and (17), thereby making the magnitude of detector noise relatively small. In this embodiment, as shown in FIG. 7, the differential detector has a current differential type configuration in which the difference in photocurrent due to the separated beams of light incident on the two photodiodes is converted to voltage by a trans-impedance amplifier 701. In such a configuration, even if the intensity of the regeneration reference light is increased in order to obtain a sufficient output level, the photocurrents of the two photodiodes due to the intensity of the regeneration reference light itself are equal and are canceled with each other, and the trans-impedance amplifier will not be saturated. It is therefore possible to provide a sufficient output signal level and effectively reduce the relative magnitude of the amplifier noise. In the aforementioned configuration of the differential detector, the two photodiodes correspond to one trans-impedance. Accordingly, the detector noise can be 3 dB lower than that of a normal detector which performs calculation using four outputs obtained by converting photocurrent of the photodiodes into voltage with the trans-impedance. This embodiment is effective in reducing amplifier noise also in this term.

As described above, the present invention has an effect of sufficiently reducing noise other than shot noise which is difficult to remove in principle and can significantly increase the signal-to-noise ratio compared to the conventional arts, thereby largely increasing the number of levels.

Figure 25A:
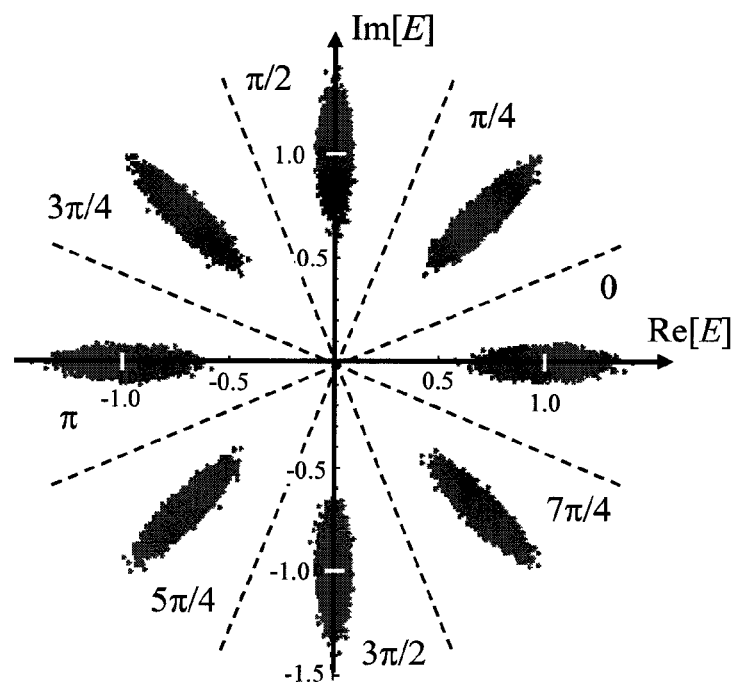
FIGS. 25A and 25B are views showing regenerated signal simulation results in the cases of eight-phase modulation and two-intensity modulation.
Figure 25B:
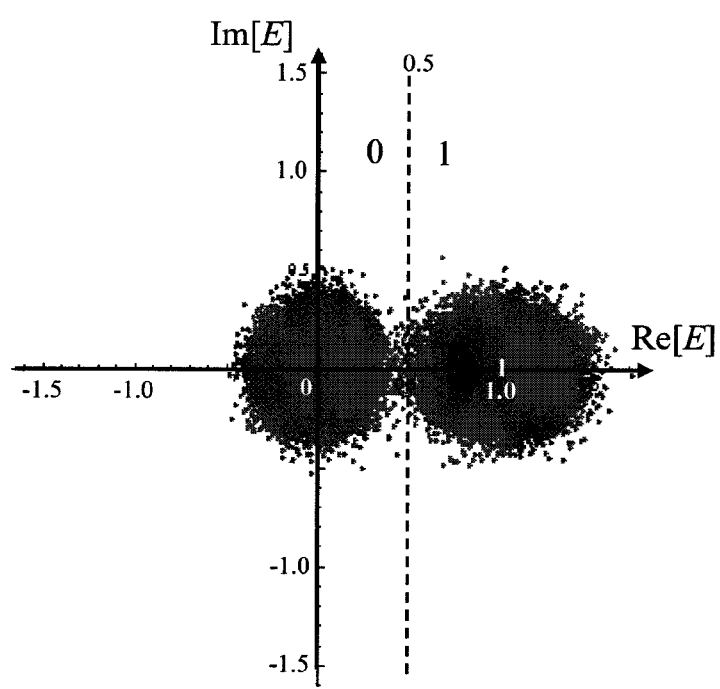

FIG. 25A shows a simulation result of regenerated signals of this embodiment on a complex plane. The complex plane represents complex amplitude of the electrical field of the regenerated light, and horizontal and vertical axes represent the real part and imaginary part of the electrical field of the regenerated light, respectively. Each point in the drawing corresponds to a regenerated signal. The scales of the horizontal and vertical axes are normalized by the signal level obtained when there is no noise. The phase value is determined depending on which one of regions partitioned with dotted lines in the drawing includes each detected signal point. The fluctuation of the signal points is due to laser noise (which can be considered equivalent to disc noise) and amplifier noise, and the fluctuation in the radial direction (corresponding to the intensity value) is larger than the fluctuation in the rotation direction (corresponding to the phase value). This means that laser noise does not affect the phase value but only affects the intensity value. In other words, the influence of laser noise is substantially negligible in detecting the phase as described above. FIG. 25B shows the distribution of the electrical fields of regenerated signals by normal two-intensity modulation with amplifier noise and laser noise equal to the case of FIG. 25A. Herein, the gain of the signals is five times in FIG. 25A. In FIG. 25B, the scale is normalized by the signal level, and amplifier noise is relatively increased to five times. In this case, the two levels are determined based on whether the value of the real part is more than 0.5. However, it is apparent that the determination error is larger than that of FIG. 25A because of the influence of noise. In the case of FIG. 25A, a high enough signal-to-noise ratio is ensured, thus resulting in little determination errors in spite of the eight level modulation. FIG. 25A shows that the method of the present invention is appropriate.

The description will be given of the principle that the calculated output expressed by Equation (18) is inputted to the decoder 142 for decoding of the differentially coded signals. The phase Δφ obtained by the calculation circuit actually contains components other than modulation phase. To be precise, the phase Δφ is expressed as:

$$(\Delta\phi) = \phi_s + \phi_{r1} + \phi_{r2} \quad (24)$$

Herein, $\phi_s$ is a phase modulated by the phase modulator; $\phi_{r1}$ is a phase difference corresponding to the path length difference (except the modulated phase) between the signal light and reference light at the time of recording; and $\phi_{r2}$ is a phase difference corresponding to the path length difference (except the modulated phase) between the regenerated light and regeneration reference light at regeneration. $\phi_{r1}$ and $\phi_{r2}$ are caused by disc surface fluctuation (shifts in the optical axis direction, in the order of 100 μm) of the recording medium mainly at recording and regeneration. These change with time. However, the speed of the disc surface fluctuation is about several ten to several hundred kHz while data is written at several ten to several hundred MHz in the present invention. $\phi_{r1}$ and $\phi_{r2}$ are therefore substantially constant at adjacent writing positions (symbols). Accordingly, outputting the difference between the adjacent symbols as a decoded signal allows signals to be regenerated without any influence of the aforementioned unnecessary phase components $\phi_{r1}$ and $\phi_{r2}$.

Figure 23:
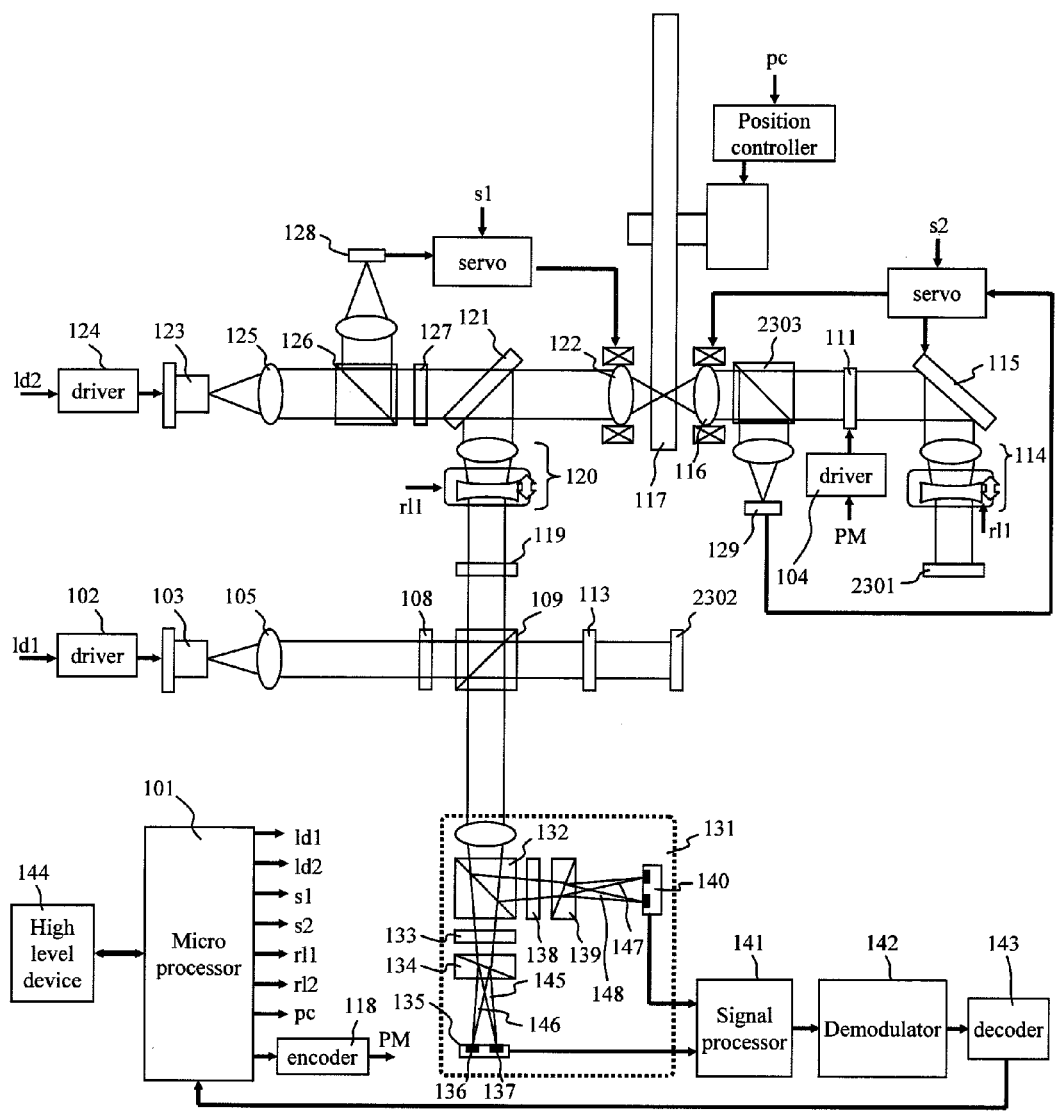
FIG. 23 is a configuration view of a signal recording ad regenerating apparatus using the reference light transmitted from the recording medium as the signal light.

In this embodiment, the signal light and reference light are generated by splitting the beam of light from the semiconductor laser 103 and are incident on different sides of the recording medium at recording. However, the way of generating the signal light and reference light and the incident way thereof are not limited to the aforementioned way. For example, as shown in FIG. 23, the reference light may be a beam of light first incident on the recording medium while the signal light may be the reference light having transmitted through the recording medium. In this case, the signal light is reflected on a mirror 2301 to travel the same optical path in a reversed way and is then incident on the recording medium again, thereby interfering with the reference light. The phase modulator 111 should be inserted between the recording medium and the mirror 2301. Moreover, similar to Patent Document 8, coaxial signal light and reference light may be incident on the recording medium in the same direction, and one of the signal light and reference light is reflected on a mirror surface constituted in a rear surface of the recording medium while the other light is focused on the same focusing point in the opposite direction.

Embodiment 2

Figure 8:
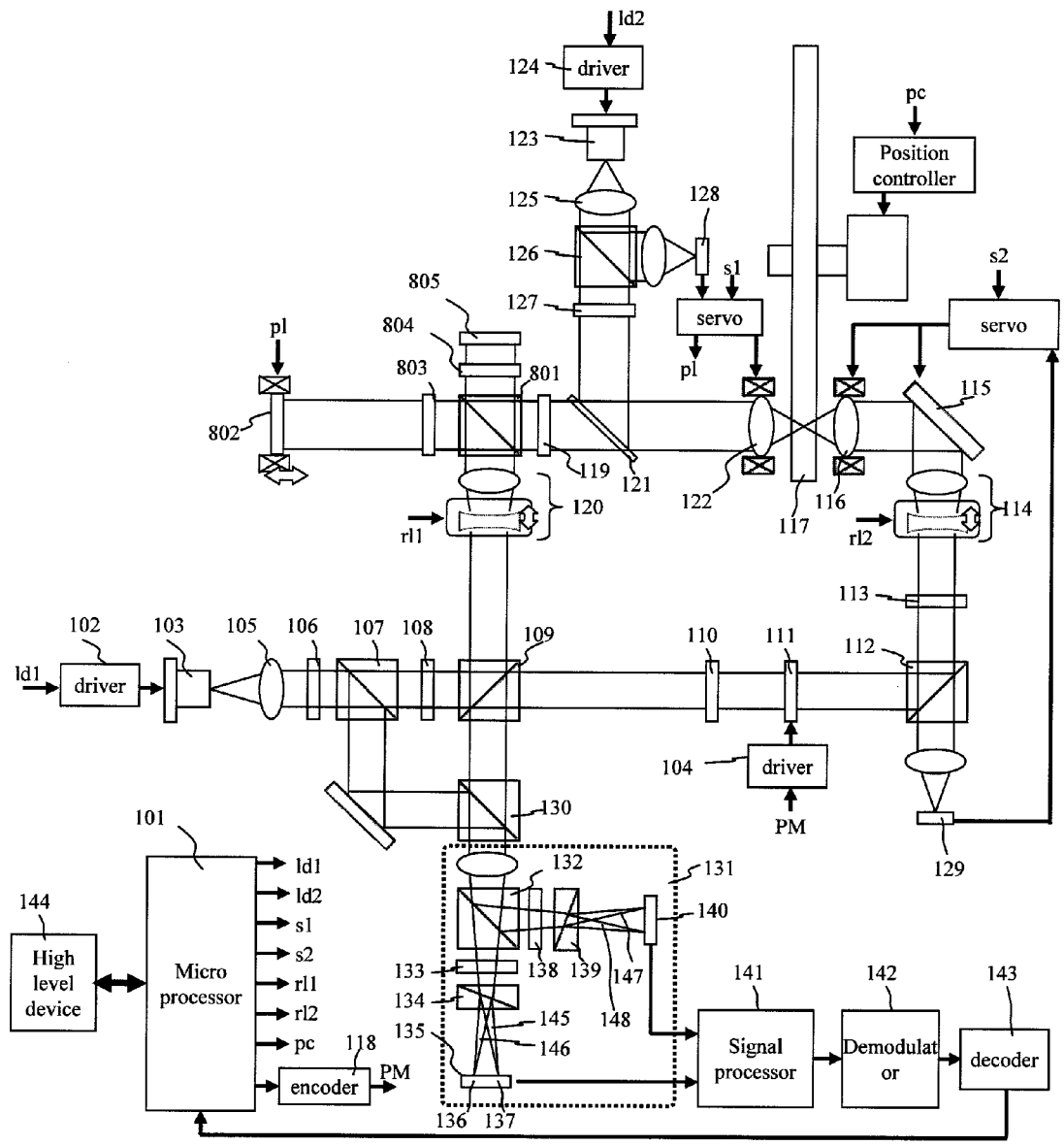
FIG. 8 is a configuration view showing another embodiment performing light path adjustment.

FIG. 8 is a configuration view of Embodiment 2 which adjusts the path length at recording and regeneration. As described in Embodiment 1, the errors of the phase accompanying the difference in path length at recording and at regeneration can be removed by the differential coding. However, when the disc surface fluctuation is very large, the phase errors of the adjacent reading phase values cannot be considered to be the same, causing errors at decoding. In this embodiment, therefore, the optical length of the reference light is adjusted at recording and regeneration in order to cancel the phase errors due to the disc surface fluctuation. The reference light is reflected on a polarizing beam splitter 801 inserted in the optical path and then reflected on a mirror 802. The reference light is then transmitted through the polarizing beam splitter 801 and is incident on the recording medium. Accordingly, the path length can be adjusted by making the mirror 802 movable in the direction of light travel.

Herein, consideration is given to a situation where the disc surface fluctuation occurs at recording. When the recording medium is moved by x in the direction of light travel because of disc surface fluctuation, the position of the standing wave needs to be moved by x so that the position of the standing wave recorded in the recording medium 117 does not change relative to the recording medium. Accordingly, the path length of the reference light needs to be changed by 2x and, in this embodiment, this can be achieved by moving the mirror 802 by x. In this embodiment, the position of the mirror 802 is changed using a focus error signal for moving the objective lens 122 in the optical axis direction.

Next, consideration is given to a case where disc surface fluctuation is caused at regeneration. In this case, the phase error does not occur if the path length of the reference light (until being incident on the polarizing beam splitter 130 after passing through the polarizing beam splitter 107) is constant since the path length of the regeneration reference light is constant. In order to implement this, the mirror 802 needs to be moved by x for a disc fluctuation x of the recording medium. The regenerated light from the recording medium 117 emits in the direction counter to the reference light. It then reflects polarizing beam splitter 801 and mirror 805, is incident on the polarizing beam splitter 801, transmit it, transmit polarizing beam splitter 109, and is combined with the regeneration reference light by polarizing beam splitter 130. Quarter-wave plates 803 and 804 have a function of rotating light polarization by 90 degrees when the light transmits them back and forth.

As described above, it is possible to reduce phase errors due to the disc surface fluctuation of the recording medium 117 by properly adjusting the path length at recording and at regeneration. In this embodiment, furthermore, the differential coding is performed similarly to Embodiment 1, considering that the path length cannot be completely adjusted. The phase errors can be thus considerably reduced.

In this embodiment, the path length of the reference light at recording and the path length of the regenerated light at regeneration are configured to be adjusted by a same mechanism. However, the path lengths can be adjusted by different mechanisms. Furthermore, the path length of the signal light may be adjusted at recording, and the path length of the regeneration reference light may be adjusted at regeneration.

Embodiment 3

Figure 9:
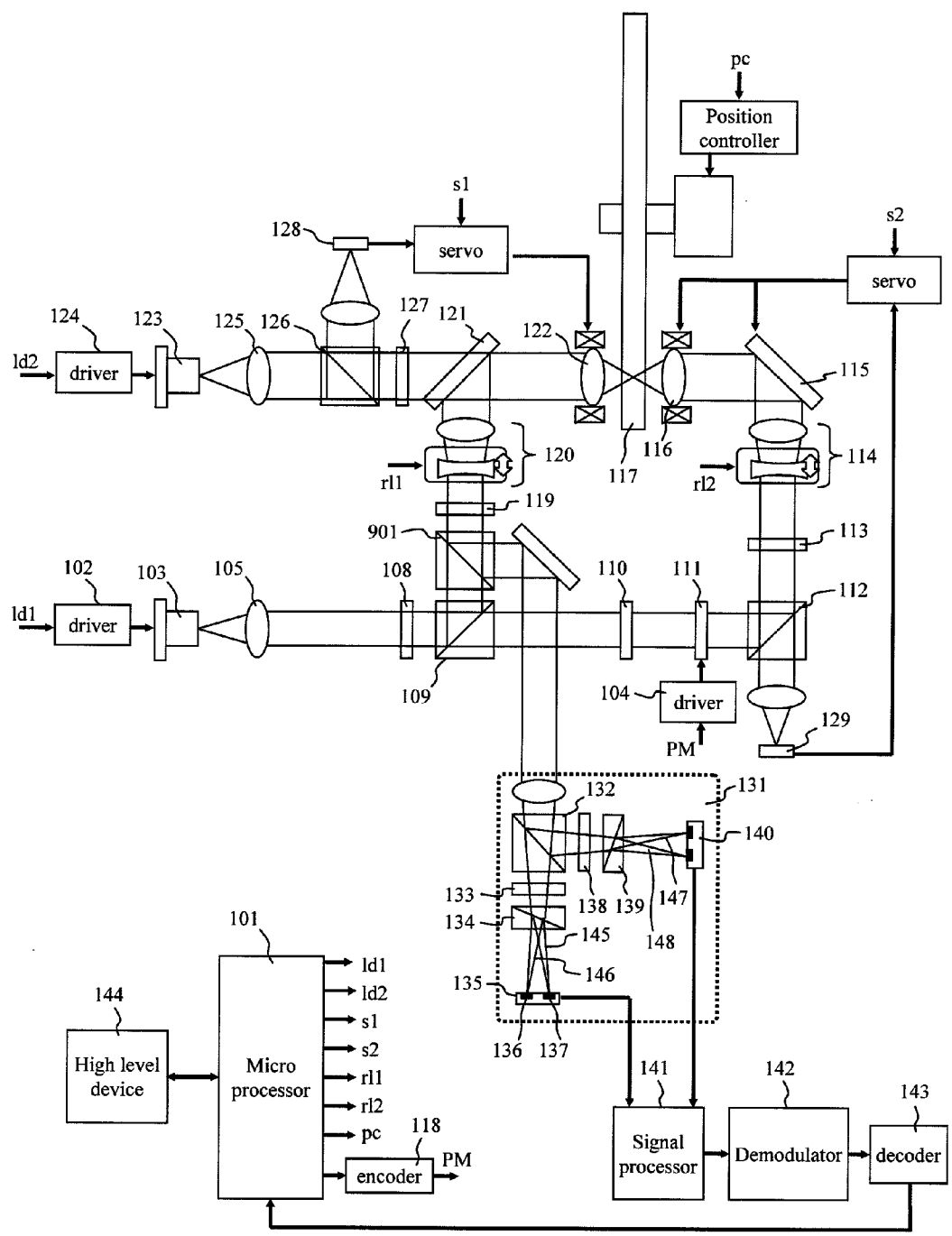
FIG. 9 is a view showing still another embodiment using a beam of signal light as regeneration reference light.

FIG. 9 is a configuration view of another embodiment in which the beam of light used as the signal light at recording is used as the regeneration reference light at regeneration. In this case, at recording, the beam of light from the semiconductor laser 103 is split into the reference light and signal light by the polarizing beam splitter 109, and the standing waves of the signal light and reference light are recorded in the recording medium 117 in the same way as Embodiment 1. At regeneration, the reference light is focused in the recording medium 117 similarly to Embodiment 1 to generate the regenerated light. Herein, a beam of signal light is generated in a similar manner to recording (the phase modulation by the phase modulator is not performed) and is focused in the recording medium 117 by the quarter-wave plate 113 with the setting angle of the optical axis reversed (set at 45 degrees at recording and −45 degrees at regeneration). The beam of signal light is coaxially superposed on the regenerated light with the polarizations thereof orthogonal to each other (regenerated light: right-circular polarization, signal light: left-circular polarization). This beam of light is passed through the quarter-wave plate 119 to allow the regenerated light to be p-polarized and the signal light (regeneration reference light) to be s-polarized, which is the same state as that in the case where the regenerated light and regeneration reference light are made coaxial by the polarizing beam splitter 130 in Embodiment 1. This beam of light is extracted by a non-polarizing beam splitter 901 and is detected by the detection optical system 131 similarly to Embodiment 1, thus providing a similar output signal.

In Embodiment 1, in order to cause the regenerated light to properly interfere with the regeneration reference light at regeneration, it is necessary to cause the regenerated light and regeneration reference light to have an accurately same beam profile, including the optical axis direction, positions, and defocuses. Especially the adjustment accuracy of the light beam direction is as strict as that in normal interfering optical systems (about 0.001 to 0.01 degrees). When the optical system is unstable, the interference becomes incomplete, and correct output signals may not be obtained. In this embodiment, the regenerated light interferes with the signal light (at recording), and the positional relationship therebetween are always controlled by the servo mechanism described in Embodiment 1. It is therefore possible to maintain good interference even when the optical system is unstable and therefore provide stable output signals.

Embodiment 4

Figure 10:
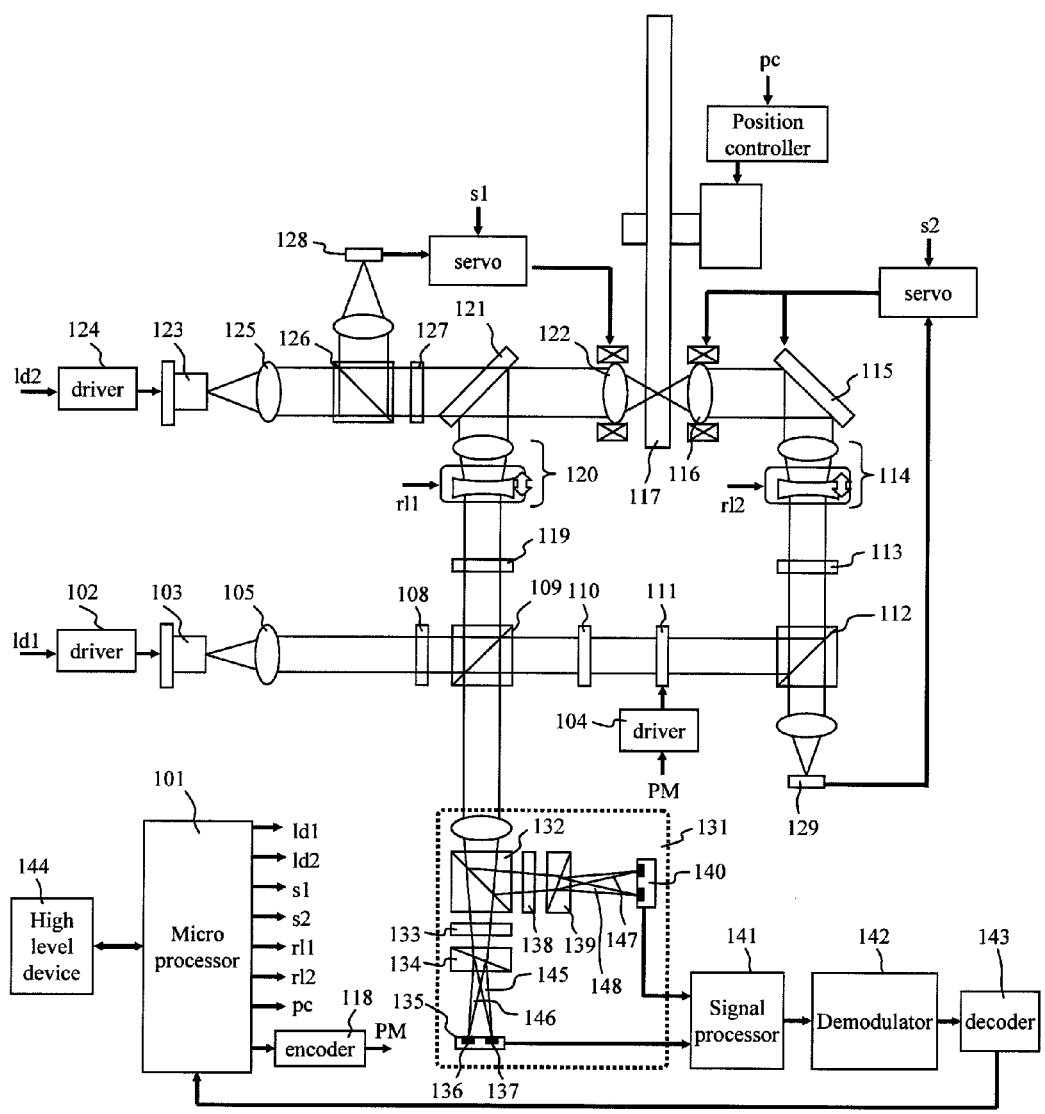
FIG. 10 is a view showing still another embodiment using reference light used for generating regenerated light as the regeneration reference light.

FIG. 10 is a configuration view of another embodiment in which the reference light is used as the regeneration reference light at regeneration. In this case, the recording operation is the same as that of Embodiment 1. At regeneration, the beams of signal light are not generated like Embodiment 1, and the regenerated light is generated from the recording medium using the reference light. The reference light generates the regenerated light in the recording medium 117, and most of the reference light is transmitted through the recording medium 117 and travels the path of the signal light in the reverse direction. At this time, the angle of the quarter-wave plate 113 is properly set, and some of the beams of light are detected by the quadrant detector 129 for use in servo drive. The rest of the beams are reflected on the polarizing beam splitter 112 and passed through the phase modulator 111 (but not modulated) and half-wave plate 110 to be incident on the polarizing beam splitter 109. The optical axis of the half-wave plate 110 is set to 0 degree unlike at recording (45 degrees at recording). The beam of reference light is s-polarized and reflected on the polarizing beam splitter 109. Herein, the regenerated light is p-polarized to be transmitted through the polarization beam splitter 109 like Embodiment 1. Accordingly, by the polarizing beam splitter 109, the regenerated light and the reference light (regeneration reference light) are made coaxial with each other with the polarizations thereof orthogonal to each other like Embodiment 1. The coaxial beams of light are detected by the detection optical system 131, and the regenerated signals are obtained in a similar manner to that of Embodiment 1.

In this embodiment, the reference light is configured to travel the path of the signal light in a reverse direction and is multiplexed with the regenerated light. Accordingly, the reference light is controlled by the servo mechanism like Embodiment 3 so that the optical axis of the reference light is precisely aligned with that of the regenerated light, thus providing stable regenerated signals. Furthermore, the reference light used for generation of the regenerated light is used as the regeneration reference light to achieve a high light use efficiency. It is therefore possible to easily secure high signal-to-noise ratio. Moreover, in this embodiment, all the processes from generation of the regeneration reference light to multiplexing of the regenerated light can be performed by an optical constitution necessary for recording. This embodiment is advantageous in miniaturizing the apparatus and reducing the cost.

Embodiment 5

Figure 11:
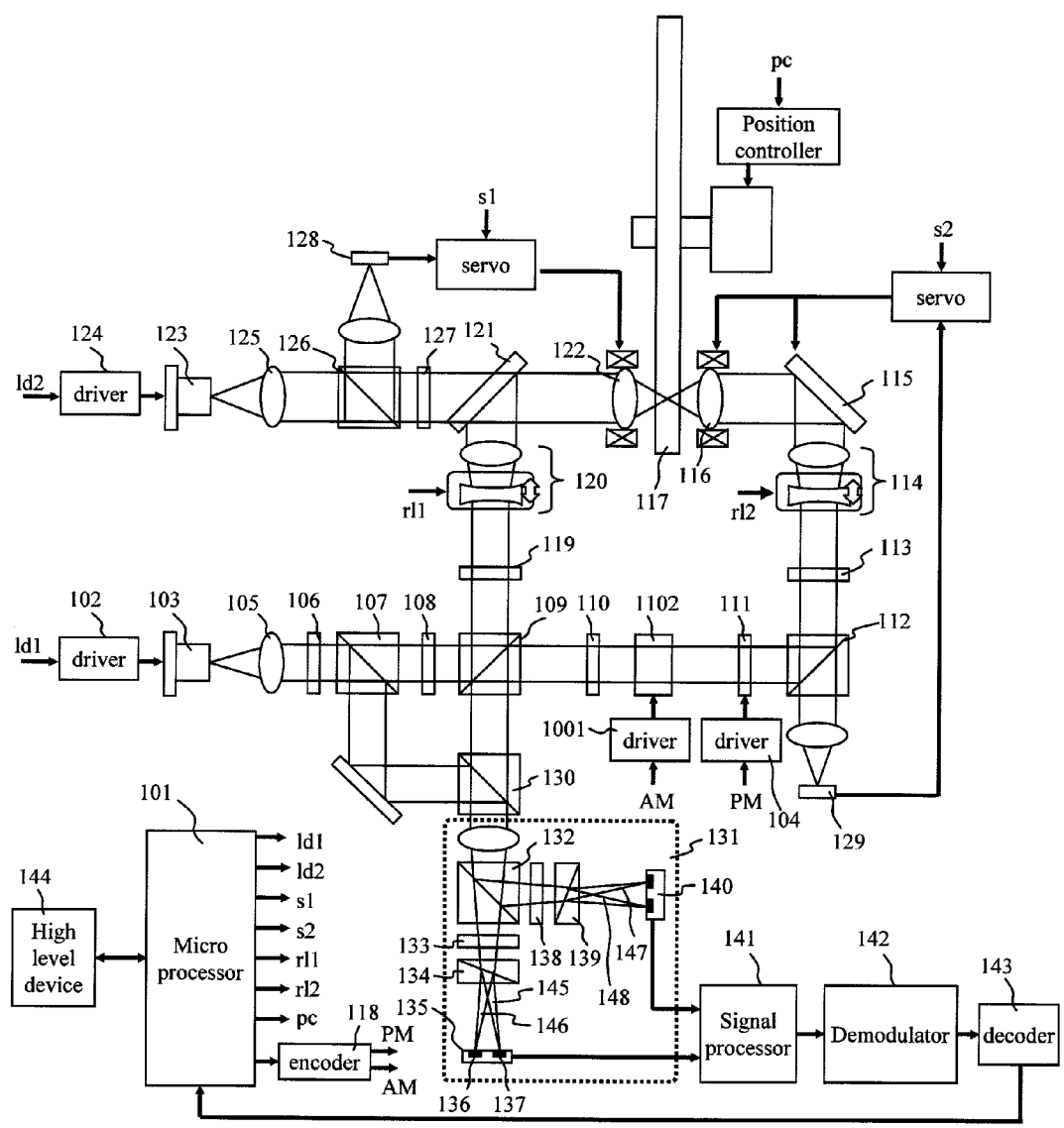
FIG. 11 is a configuration view of still another embodiment which records and reproduces complex amplitudes of optical electric fields.
Figure 12:
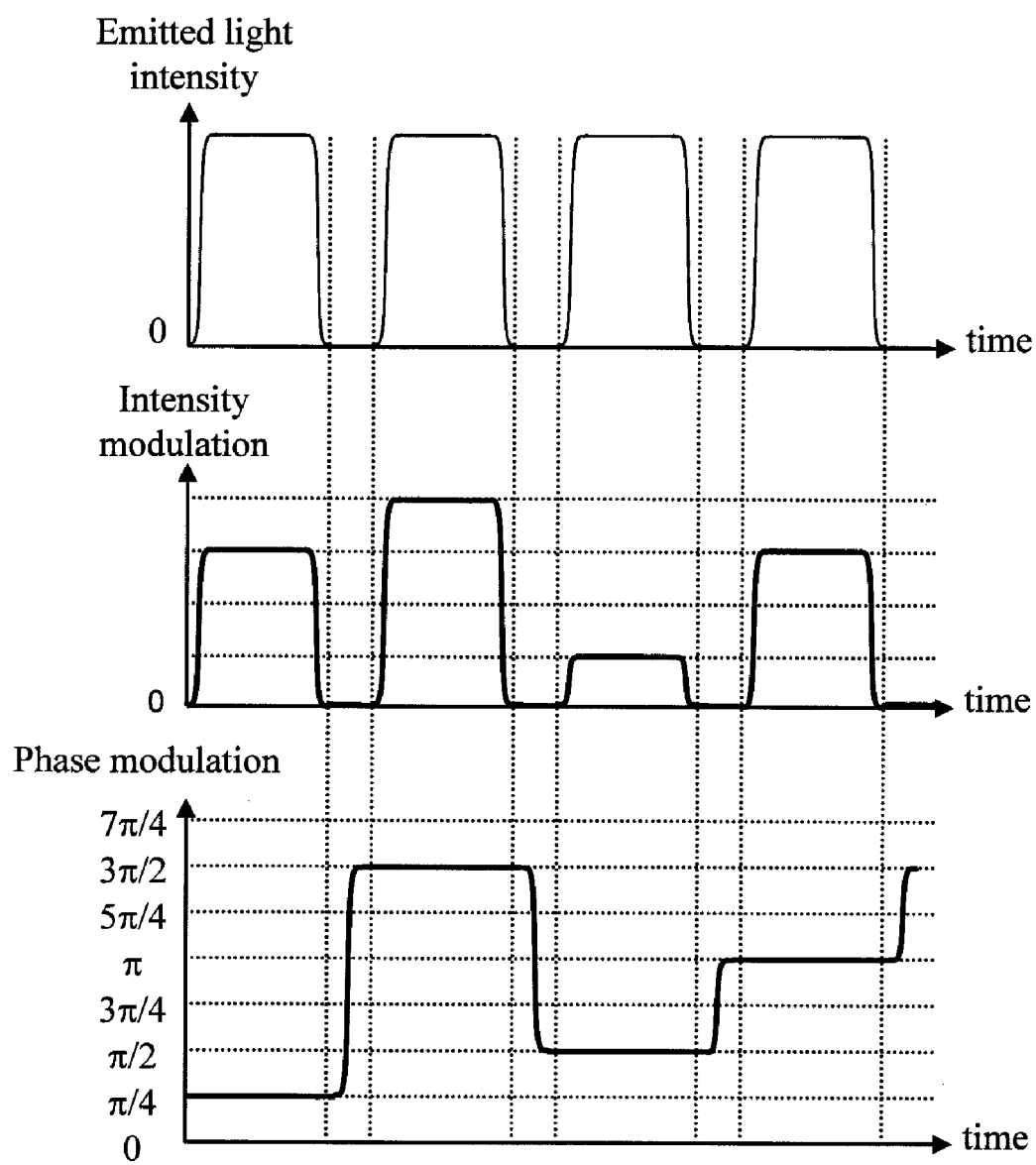
FIG. 12 is a view showing a relationship among the emitted light pattern of the light source, intensity modulation, and phase modulation in an embodiment performing intensity modulation and phase modulation for modulation of the complex amplitudes of the optical electric fields.

In this embodiment, information of the complex amplitude of light is recorded as the standing wave to further increase the number of levels. The configuration of this embodiment is shown in FIG. 11. The recording and regenerating operations are basically the same as those of Embodiment 1, but the signal modulation at recording includes intensity modulation as well as phase modulation in this embodiment. To be more specific, user data is converted by the encoding circuit 118 to modulation signals for the phase modulator 111 and an intensity modulator 1102, which are then driven by the driver 104 and a driver 1001. This embodiment employs 32-level modulation with four amplitudes and eight phases. As shown in FIG. 12, each pulse of emitted light is modulated by the intensity modulator to have one of four different values of peak intensity and then modulated to have one of eight different phases. The intensity modulator is a combination of rotation of polarization by an electro-optic element and a polarizer.

In the standing wave composed of the signal light and reference light modulated as described above, the intensity difference between peak and bottom intensities and the positions thereof in the direction of light travel are modulated and are recorded as change in reflectivity.

The operation of the optical system at regeneration is the same as that of Embodiment 1. Herein, the intensity of the regenerated light is proportional to the square of the difference in reflectivity corresponding to the above difference between the peak and bottom intensities. Accordingly, the intensity of the regenerated light is modulated corresponding to the intensity modulation performed at recording.

After the regenerated light is detected by the interference optical system, the signal processing circuit outputs the following calculation result in parallel to the calculation shown in Equation (18).

$$|E_s E_r| = \sqrt{D_1^2 + D_2^2} \quad (25)$$

This calculation output is proportional to the absolute value of the amplitude of the regenerated light or the square root of the intensity. Accordingly, the intensity-modulated beam is demodulated based on the calculation output. The phase demodulation is similarly performed. The demodulated intensity modulation value and phase modulation value are outputted from the demodulator 142, and the decoding circuit 143 provides information corresponding to a combination of these values.

When the intensity modulation is performed at multiple levels, similar to Patent Document 1 and the like, the signal level is substantially reduced, and the signal-to-noise ratio could be insufficient. However, in the present invention, in the same way as described in Embodiment 1, with the sufficiently high level of the regeneration reference light, the signal level expressed by Equation (25) can be amplified. This can prevent the reduction in signal level due to modulation at multiple levels and provide a sufficient signal-to-noise ratio. Accordingly, the number of levels can be easily increased not only at phase modulation but also at intensity modulation.

Figure 26:
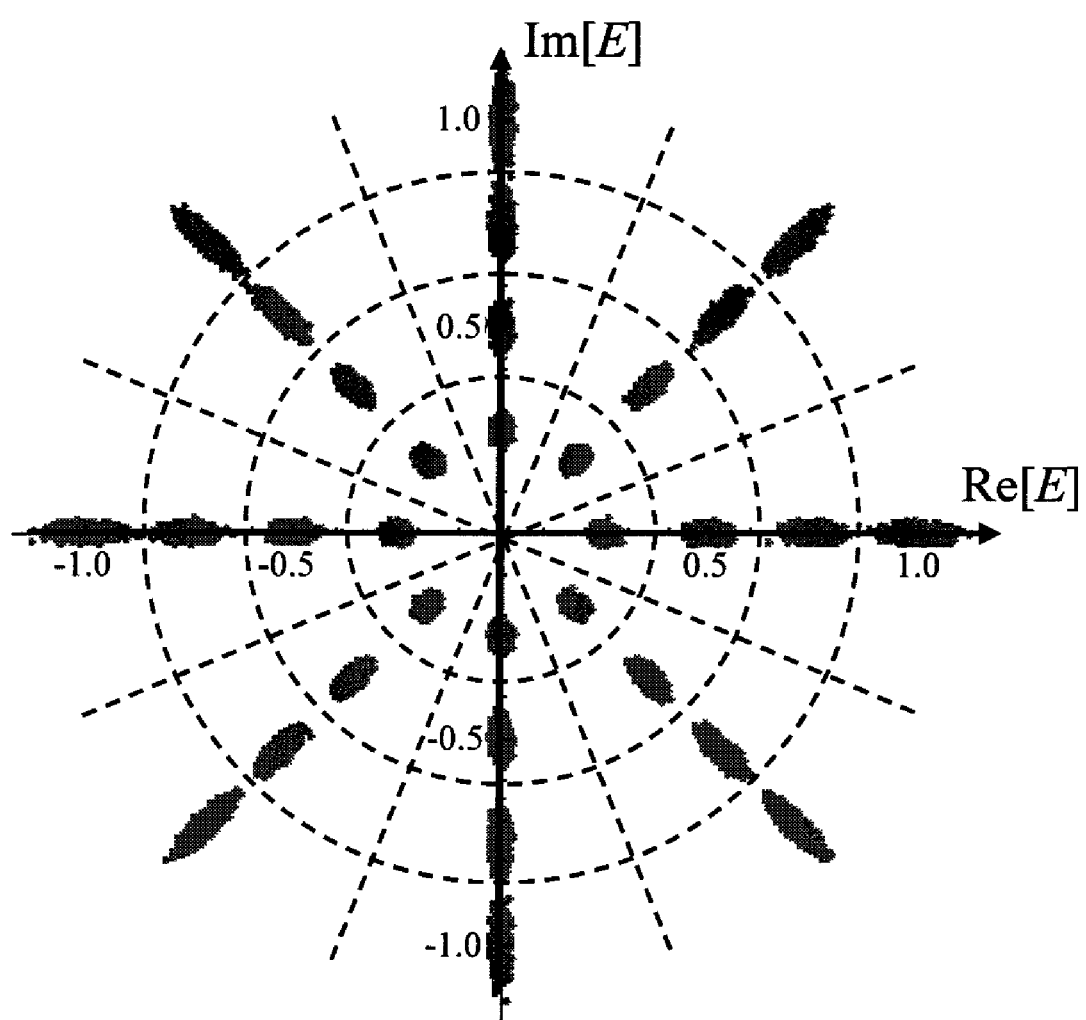
FIG. 26 is a view showing regenerated signal simulation results in the cases of four-intensity modulation and eight-phase modulation.

FIG. 26 shows the simulation result of regenerated signals in the case of modulation with four amplitudes and eight phases as an actual example. Each point of the drawing corresponds to a regenerated signal like FIG. 25A, and the amplitude and phase values are estimated based on which one of the regions partitioned by dotted lines in the drawing includes the signal point. In this case, the laser noise and amplifier noise directly affect the determination of the amplitude level unlike Embodiment 1 and therefore need to be minimized.

Figure 13:
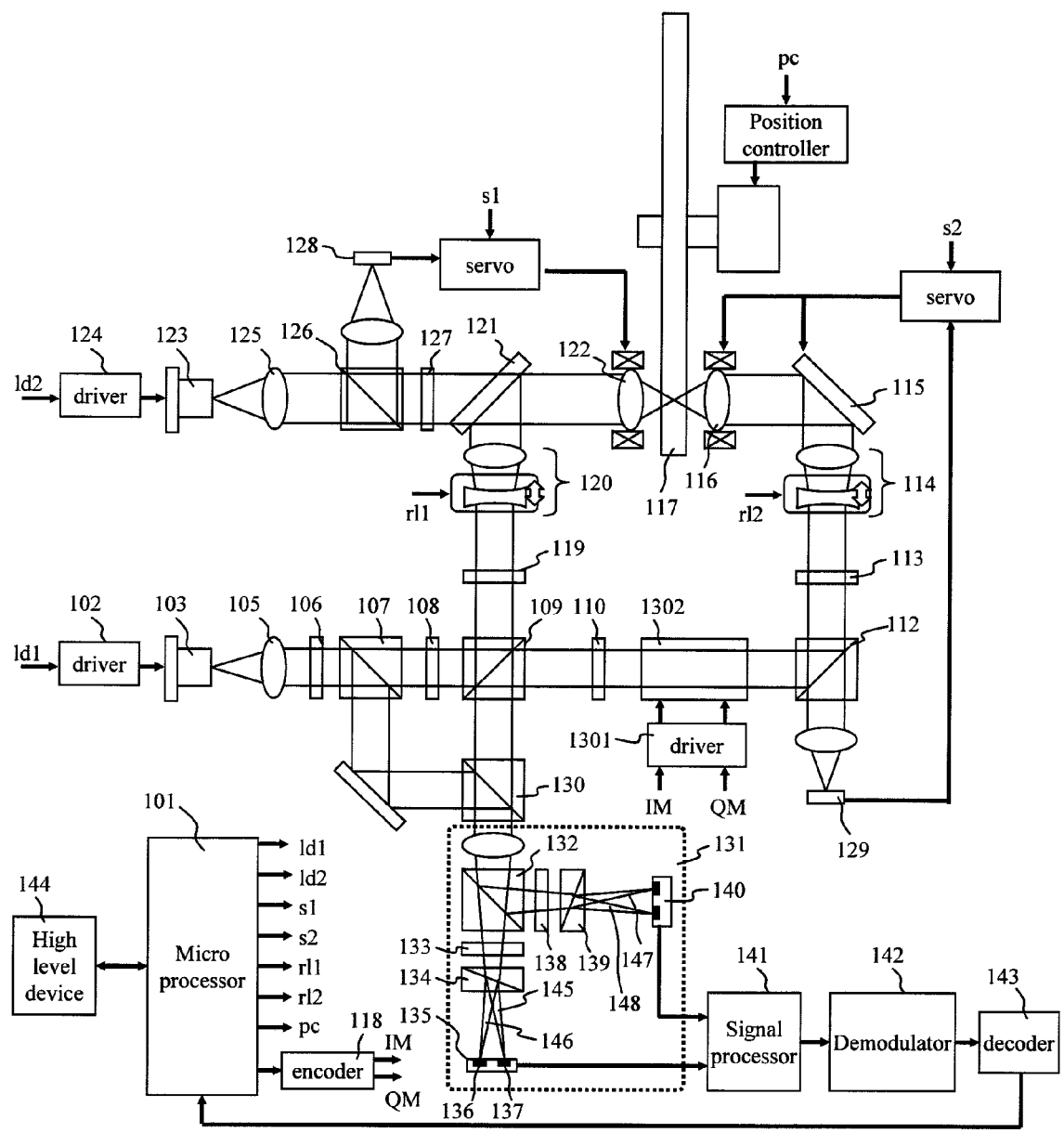
FIG. 13 is a configuration view showing still another embodiment performing complex amplitude modulation of optical electric fields with a complex amplitude modulator.
Figure 14:
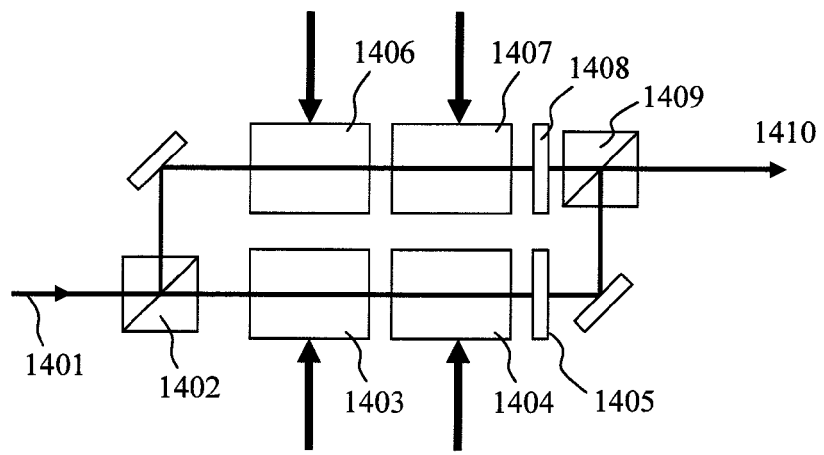
FIG. 14 is a configuration diagram of the complex amplitude modulator.

In this embodiment, arbitrary complex amplitude is generated by the combination of the intensity and phase modulators. However, the modulation way is not limited to this. For example, FIG. 13 is a configuration view in which the real and imaginary parts of the complex amplitude are independently modulated. In this case, modulation signals for real and imaginary parts are generated by the encoding circuit 118 and are driven by a driver 1301 to a complex amplitude modulator 1302. The configuration of the complex amplitude modulator 1302 is shown in FIG. 14. S-polarized incoming light 1401 is split into two by a non-polarizing beam splitter 1402. The transmitted light passes through phase modulators 1403 and 1404 and a polarizer 1405. The reflected light passes through phase modulators 1406 and 1407 and a polarizer 1408. These beams of light are multiplexed at a non-polarizing beam splitter 1407 with a path length difference of ¼ wavelength, and an output light 1408 is thus obtained. The phase modulators 1403 and 1406 are electro-optic elements changing the phase of only a 45-degrees polarized component according to driving voltage. Similarly, the phase modulators 1404 and 1407 are electro-optic elements changing the phase of only the −45-degrees polarized component according to driving voltage. The electro-optic elements 1403 and 1404 receive the modulation signal for the real part as the driving voltage. The driving voltages applied to the two elements have a same absolute value but opposite signs for modulation of the phase values with opposite signs. At this time, the polarization of light having passed through these elements is expressed as:

$$\frac{1}{4}\begin{pmatrix} 1+e^{-i\phi_I} & -1+e^{-i\phi_I} \\ -1+e^{-i\phi_I} & 1+e^{-i\phi_I} \end{pmatrix}\begin{pmatrix} 1+e^{-i\phi_I} & 1-e^{-i\phi_I} \\ 1-e^{-i\phi_I} & 1+e^{-i\phi_I} \end{pmatrix}\begin{pmatrix} 0 \\ E_s/\sqrt{2} \end{pmatrix} = \frac{1}{\sqrt{2}}\begin{pmatrix} iE_s\sin\phi_I \\ E_s\cos\phi_I \end{pmatrix} \quad (26)$$

Herein, Es is an electric field of the incoming light (assuming that the phase is 0), and $\phi_I$ is modulation phase. Thereafter, when only the s-polarized component is transmitted through the polarizer 1405, the electric field of the transmitted light is:

$$\frac{1}{\sqrt{2}}E_s\cos\phi_I \quad (27)$$

The electro-optic elements 1406 and 1407 operates in the same way based on the modulation signal of the imaginary part, and the electric field of the light transmitted through the polarizer 1408 is expressed as:

$$\frac{1}{\sqrt{2}}E_s\cos\phi_Q \quad (28)$$

$\phi_Q$ is modulation phase. The beams of light having the electric fields expressed by Equations 27 and 28 are multiplexed with a path length difference of ¼ wavelength. The electric field of the multiplexed light is expressed as:

$$\frac{1}{\sqrt{2}}E_s(\cos\phi_I + i\cos\phi_Q) \quad (29)$$

Equation 29 shows that the real and imaginary parts of the electric field are decided by magnitudes of $\phi_I$ and $\phi_Q$, respectively.

Figure 15A:
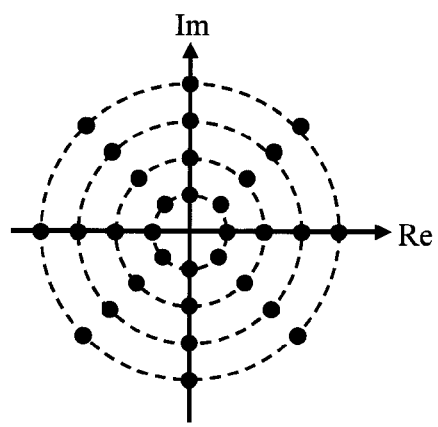
FIGS. 15A and 15B are views showing a difference in arrangement of signal points depending on the modulation schemes.
Figure 15B:
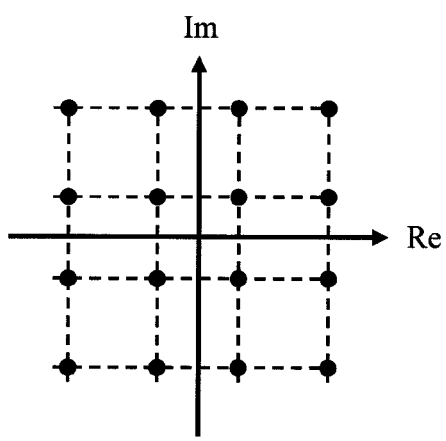

The difference between the combination of intensity modulation and phase modulation and complex amplitude modulation becomes apparent by displaying modulation signals (signal points) on a complex plane. The former is equivalent to modulation of the absolute value (intensity) and argument (phase) of the complex amplitude. Accordingly, when the absolute value and argument are independently modulated, the signal points form concentric circles shown in FIG. 15A. In the case of complex amplitude modulation, the real and imaginary parts of the complex amplitude are modulated. When the real and imaginary parts of the complex amplitude are independently modulated, the signal points are arranged in a lattice as shown in FIG. 15B (this may not be true when the real and imaginary parts are not independently modulated).

Embodiment 6

Figure 16:
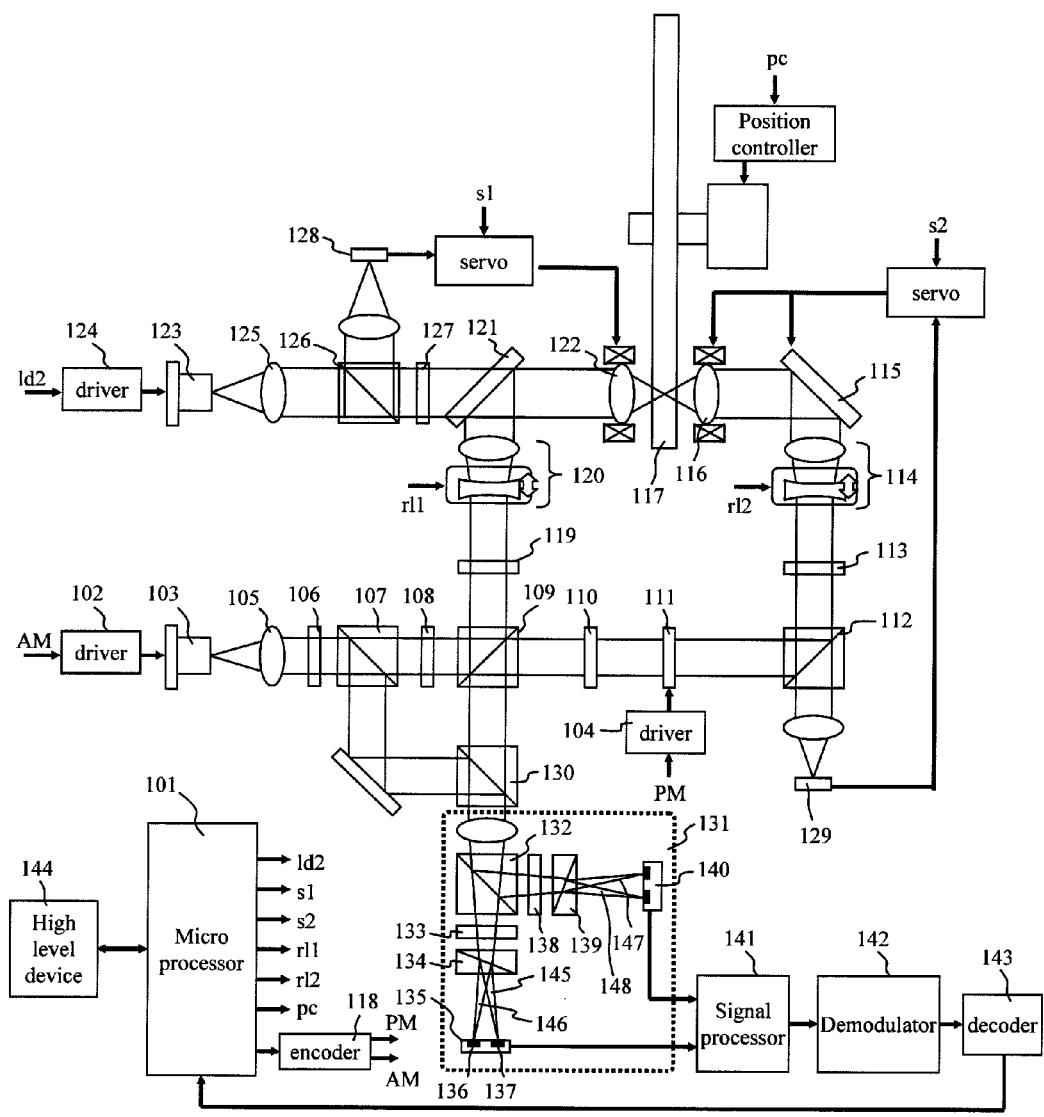
FIG. 16 is a configuration view showing still another embodiment changing light emission power of the light source for intensity modulation.

FIG. 16 shows another embodiment in which the intensity modulation is implemented by performing intensity modulation for a semiconductor laser. The intensity modulator is not used in this case, and the peak intensity of the semiconductor laser 103 is modulated based on modulation signals from the encoding circuit 118. In other words, the light intensity pattern obtained after the light is passed through the intensity modulator 1102 in Embodiment 5 is created by driving current of the semiconductor laser. In this case, the intensity of the reference light is modulated together with the signal light, and the intensity of the regenerated light at regeneration can be also changed according to the modulation intensity, thus implementing intensity modulation. In order to properly output the servo signal, the signal modulation component of the output of the quadrant detector 129 is removed by a not-shown low pass filter. Such a configuration can reduce the number of parts, miniaturize the apparatus, and reduce the cost.

Embodiment 7

Figure 17:
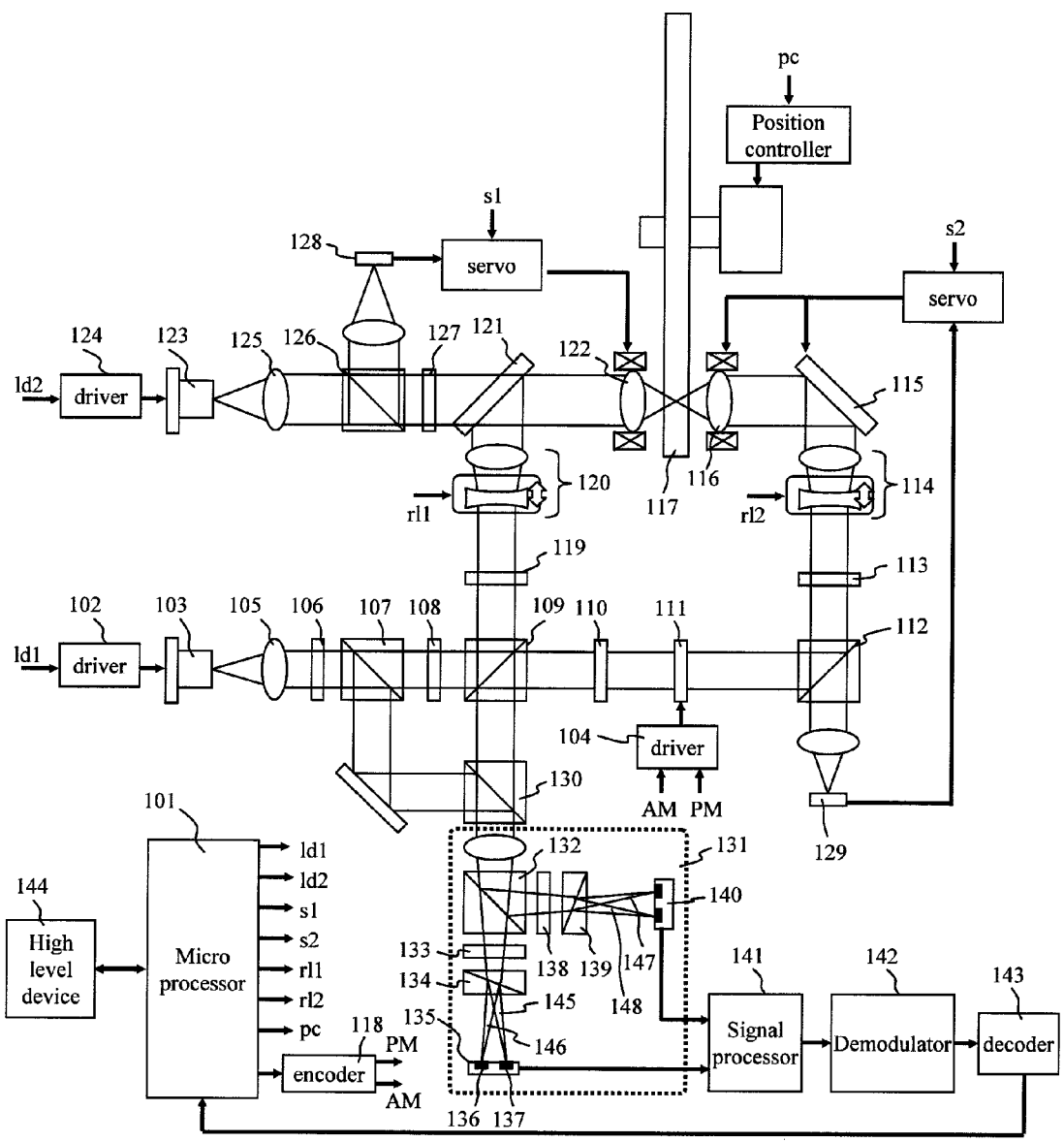
FIG. 17 is a configuration view showing still another embodiment performing complex amplitude modulation of the optical electric fields with a single phase modulator.
Figure 18:
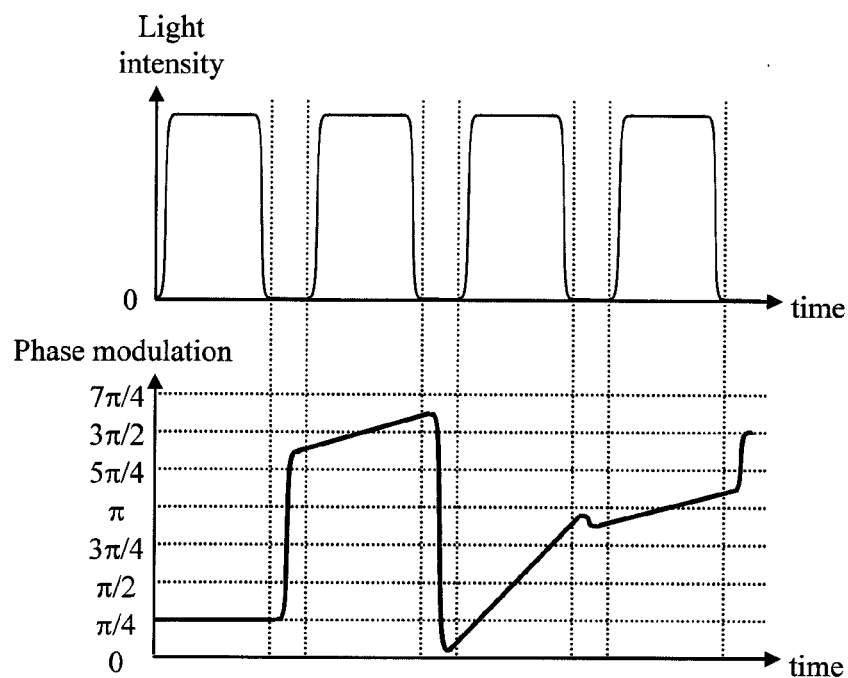
FIG. 18 is a view showing a modulation pattern of the phase modulator in the embodiment performing the complex amplitude modulation of the optical electric fields with the single phase modulator.

FIG. 17 shows another embodiment simultaneously performing intensity modulation and phase modulation using only one phase modulator. In such a case, the intensity of the regenerated light is modulated by changing the phase of the signal light to reduce the contrast of the reflectivity distribution while the standing waves are being recorded. To be specific, as shown in FIG. 18, the phase of each pulse of light is not kept constant but is changed linearly. The middle point of such a linear change is recorded as the phase value. The inclination of the straight line (a stroke of change) corresponds to the magnitude of the intensity modulation. The larger the stroke of change is, the larger distance the standing wave is shifted during recording. The contrast of the recorded change in reflectivity is accordingly reduced, and the intensity of regenerated light at regeneration is reduced.

Figure 19:
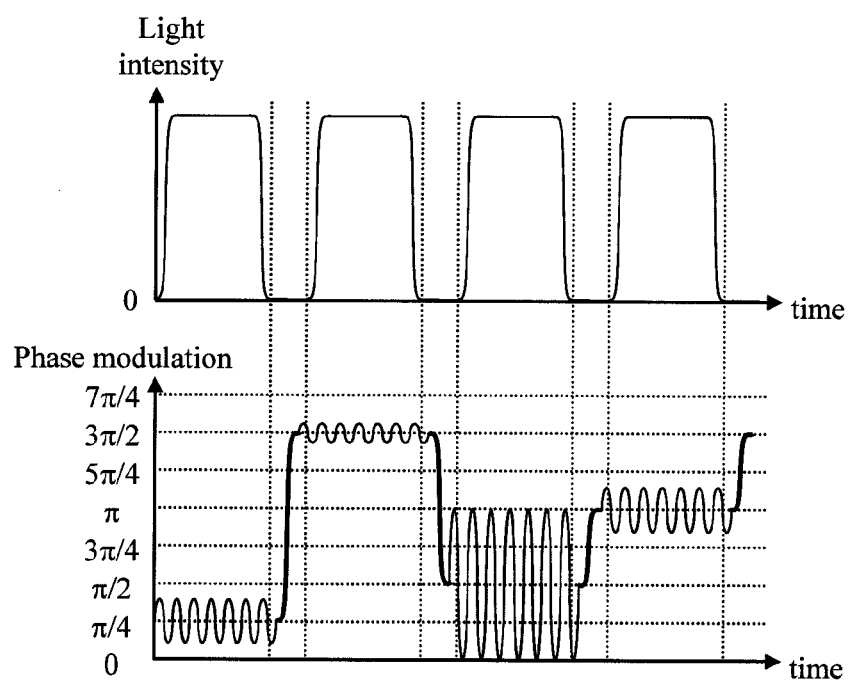
FIG. 19 is a view showing a modulation pattern of the phase modulator in the embodiment performing the complex amplitude modulation of the optical electric fields with the single phase modulator.
Figure 20:
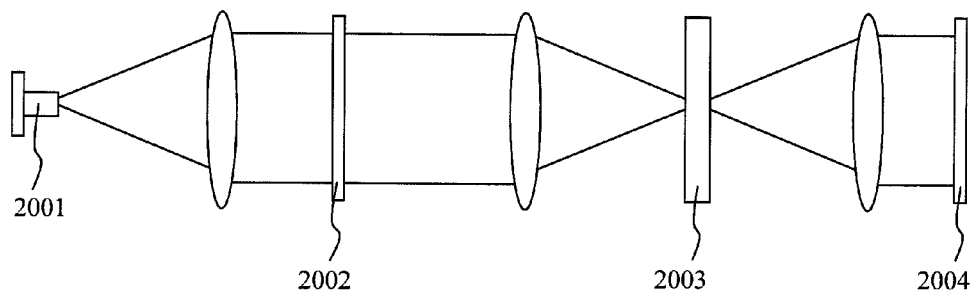
FIG. 20 is a configuration view of a conventional art.
Figure 21:
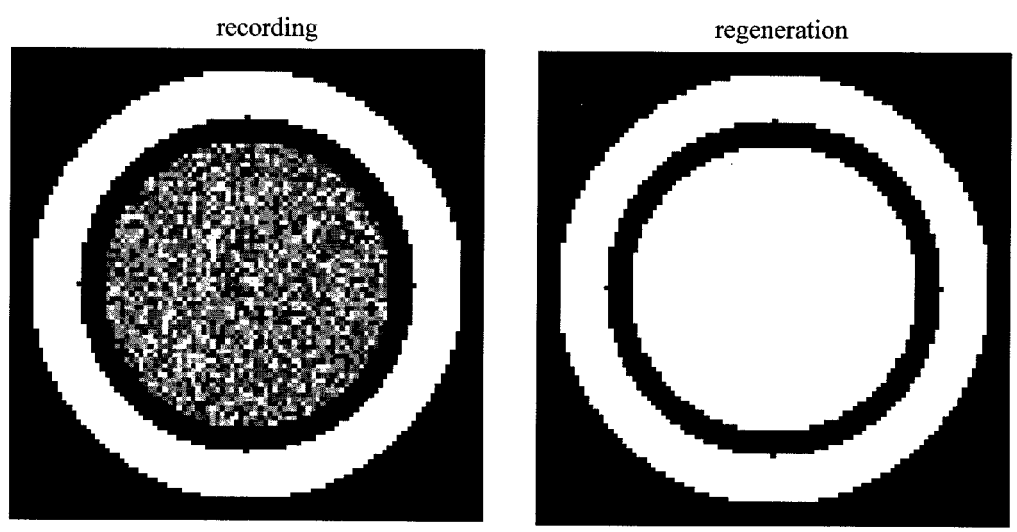
FIGS. 21A and 21B are views showing modulation patterns by a spatial modulator in the conventional art.
Figure 22:
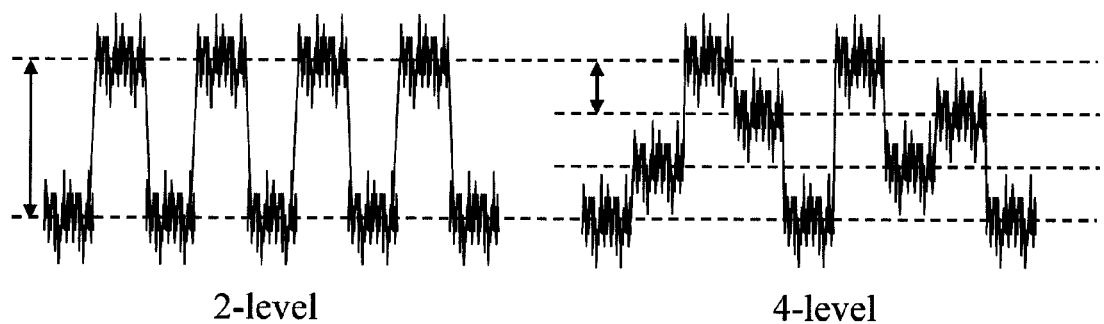
FIG. 22 is a view showing a comparison between two-level and multi-level regenerated signals.

The modulation way is not limited to this one. The phase may be modulated at high speed at emission of each pulse as shown in FIG. 19, for example. In this case, as the amplitude of modulation increases, the contrast of the recorded change in reflectivity decreases, and the intensity of the regenerated light at regeneration decreases. The center of the modulated light beam is a phase value to be recorded. In FIG. 19, the high speed modulation is performed at a constant frequency but may be random modulation.

INDUSTRIAL APPLICABILITY

According to the present invention, it is possible to provide an optical recording and regenerating apparatus providing high capacity and high transfer speed. The present invention is expected to be widely industrially applied to high capacity video recorders, hard disc backup devices, stored information archive devices.

Explanation of Reference Numerals

| | |
|---|---|
| 101 | microprocessor |
| 102 | driver |
| 103 | semiconductor laser |
| 104 | driver |
| 105 | collimation lens |
| 106, 108, 110 | half-wave plate |
| 107, 109, 112 | polarizing beam splitter |
| 111 | phase modulator |
| 113, 119 | quarter-wave plate |
| 114, 120 | relay lens |
| 115 | Galvano-mirror |
| 116, 122 | objective lens |
| 117 | recording medium |
| 118 | encoding circuit |
| 121 | dichroic mirror |
| 123 | semiconductor laser |
| 124 | driver |
| 125 | collimation lens |
| 126 | polarizing beam splitter |
| 127 | quarter-wave plate |
| 128, 129 | quadrant detector |
| 130 | polarizing beam splitter |
| 131 | detection optical system |
| 132 | non-polarizing beam splitter |
| 133 | half-wave plate |
| 134, 139 | Wollaston prism, |
| 135, 140 | differential detector |
| 136, 137 | photodetector |
| 138 | quarter-wave plate |
| 141 | signal processing unit |
| 142 | demodulator |
| 143 | decoding circuit |
| 144 | higher level device |
| 145, 146, 147, 148 | interfering light |
| 701 | trans-impedance amplifier |
| 801 | polarizing beam splitter |
| 802 | mirror |
| 803 | quarter-wave plate |
| 901 | non-polarizing beam splitter |
| 1101 | driver |
| 1102 | intensity modulator |
| 1301 | complex amplitude modulator |
| 1302 | driver |
| 1401 | incoming light |
| 1402, 1409 | non-polarizing beam splitter |
| 1403, 1404, 1406, 1407 | phase modulator |
| 1405, 1408 | polarizer |
| 1410 | output light |
| 2001 | light source |
| 2003 | spatial light modulator |
| 2003 | recording medium |
| 2004 | image sensor |
| 2401 | non-polarizing beam splitter |
| 2402, 2403 | phase plate |
| 2404, 2405, 2406 | polarizer |
| 2407, 2408, 2409 | detector |

What is claimed is:

1. An optical recording and reproducing apparatus focusing two opposed beams of light at a same place in an optical recording medium to record a standing wave generated by interference of the two beams of light, the apparatus comprising:
    a phase modulating means for applying multi-level modulation to a phase of at least one of the two beams of light;
    an interference optical system causing reproduction reference light to interfere with reproduced light to simultaneously generate three or more beams of interfering light with different interference phases, the reproduction reference light being generated by a light source, the reproduced light being generated by projecting one of the two beams of light onto the optical recording medium;
    detectors which detect the three or more beams of interfering light; and
    a demodulator which demodulates the phase modulated by the phase modulating means from an output of the detector.

2. The optical recording and reproducing apparatus according to claim 1, wherein the phase to be modulated by the phase modulating means is differentially coded.

3. The optical recording and reproducing apparatus according to claim 1, wherein
    the number of the beams of interfering light is four,
    interference phases of the four beams of interfering light differ from one another by substantially 90 degrees, and
    each pair of the beams of interfering light having a difference in interference phase of substantially 180 degrees is detected by a differential detector of current differential detection type.

4. The optical recording and reproducing apparatus according to claim 1, wherein the light source emits pulses of light,
    the phase modulating means drives a certain driving phase when the light source is emitting light, and
    the phase modulating means changes the driving phase when the light source is not emitting light.

5. The optical recording and reproducing apparatus according to claim 1, further comprising:
    a first path length adjusting mechanism adjusting both or any one of the two beams of light; and
    a second path length adjusting mechanism adjusting both or any of the beams of the reproduced light and the reproduction reference light.

6. The optical recording and reproducing apparatus according to claim 5, wherein the first path length adjusting mechanism is the same as the second path length adjusting mechanism.

7. The optical recording and reproducing apparatus according to claim 1, wherein the reproduction reference light is one of the two beams of light which is not used in generation of the reproduced light.

8. The optical recording and reproducing apparatus according to claim 1, wherein the reproduction reference light is one of the two beams of light which is used in generation of the reproduced light.

9. An optical recording and reproducing apparatus focusing two opposed beams of light at a same place in an optical recording medium to record a standing wave generated by interference of the two beams of light, the apparatus comprising:
    a complex amplitude modulating means for modulating complex amplitude of optical electric field of one of the two beams of light;

an interference optical system causing reproduction reference light to interfere with reproduced light to simultaneously generate three or more beams of interfering light with different interference phases, the reproduction reference light being generated by a light source, the reproduced light generated by projecting one of the two beams of light onto the optical recording medium;

detectors detecting the three or more beams of interfering light; and a demodulator demodulating the complex amplitude modulated by the complex amplitude modulating means from an output of the detector.

10. The optical recording and reproducing apparatus according to claim 9, wherein
the complex amplitude modulating means includes an intensity modulating means and a phase modulating means, and
the intensity modulating means modulates light emission intensity of the light source.

11. The optical recording and reproducing apparatus according to claim 9, wherein the complex amplitude modulating means is a single phase modulating means.

12. The optical recording and reproducing apparatus according to claim 10, wherein the phase to be modulated by the phase modulating means is differentially coded.

13. The optical recording and reproducing apparatus according to claim 9, wherein
the number of the beams of interfering light is four,
interference phases of the four beams of interfering light differ from one another by substantially 90 degrees, and
each pair of the beams of interfering light having a difference in interference phase of substantially 180 degrees is detected by a differential detector of current differential detection type.

14. The optical recording and reproducing apparatus according to claim 10, wherein the light source emits pulses of light, and the phase modulating means drives a certain driving phase while the light source is emitting light and changes the driving phase while the light source is not emitting light.

15. The optical recording and reproducing apparatus according to claim 9, further comprising:
a first path length adjusting mechanism adjusting both or any one of the two beams of light; and
a second path length adjusting mechanism adjusting both or any of the reproduced light and the reproduction reference light.

16. The optical recording and reproducing apparatus according to claim 15, wherein the first path length adjusting mechanism is the same as the second path length adjusting mechanism.

17. The optical recording and reproducing apparatus according to claim 9, wherein the reproduction reference light is one of the two beams of light which is not used in generation of the reproduced light.

18. The optical recording and reproducing apparatus according to claim 9, wherein the reproduction reference light is one of the two beams of light which is used in generation of the reproduced light.

19. An information reproducing apparatus comprising:
a light source;
an interference optical system causing reproduced light to interfere with reproduction reference light to simultaneously generate at least three beams of interfering light with different interference phases, the reproduced light being generated by irradiating an optical recording medium with light and subjected to multi-level modulation, the reproduction reference light being generated from the light source;
detectors which detect the three or more beams of interfering light; and
a demodulator which demodulates the phase of the regenerated light from an output of the detector.

20. The information reproducing apparatus according to claim 19,
wherein the at least three beams of interfering light include four beams of interfering light;
wherein interference phases of the four beams of interfering light differ from one another by approximately 90 degrees; and
wherein the phase of the reproduced light is demodulated by the demodulator based on an intensity ratio of difference signals of pairs of interference light with phase differences of approximately 180 degrees.

21. The information reproduced apparatus according to claim 19, wherein
the phase is modulated in accordance with the following formula $$\Delta\phi = \begin{cases} \arctan\dfrac{D_2}{D_1}(D_1 \geq 0) \\ \pi + \arctan\dfrac{D_2}{D_1}(D_1 < 0) \end{cases}$$

where $\Delta\phi$ is the phase of the regenerated light with respect to the phase of the reproduction reference light, and $D_1$ and $D_2$ are outputs of the detectors respectively.

22. An optical recording apparatus focusing two opposed beams of light at a same place in an optical recording medium to record a standing wave generated by interference of the two beams of light, the apparatus comprising:
a phase modulating means for applying multi-level modulation to a phase of at least one of the two beams of light;
an interference optical system causing reproduction reference light to interfere with reproduced light to simultaneously generate three or more beams of interfering light with different interference phases, the reproduction reference light being generated by a light source, the reproduced light being generated by projecting one of the two beams of light onto the optical recording medium; and
detectors which detect the three or more beams of interfering light.

* * * * *